(12) United States Patent
Wan et al.

(10) Patent No.: US 7,984,037 B2
(45) Date of Patent: Jul. 19, 2011

(54) METHOD FOR EVALUATING XPATH-LIKE FRAGMENT IDENTIFIERS OF AUDIO-VISUAL CONTENT

(75) Inventors: Ernest Yiu Cheong Wan, Carlingford (AU); Myriam Elisa Lucie Amielh, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 11/181,765

(22) Filed: Jul. 15, 2005

(65) Prior Publication Data

US 2006/0020631 A1 Jan. 26, 2006

(30) Foreign Application Priority Data

Jul. 16, 2004 (AU) ................................ 2004903938

(51) Int. Cl.
*G06F 7/00* (2006.01)
*G06F 17/30* (2006.01)
(52) U.S. Cl. ........................ 707/711; 707/913
(58) Field of Classification Search .................. 707/101
See application file for complete search history.

(56) References Cited

U.S. PATENT DOCUMENTS

2005/0251735 A1* 11/2005 Dunietz et al. ................ 715/513

FOREIGN PATENT DOCUMENTS

| AU | 200059475 | 3/2001 |
|---|---|---|
| AU | 2003252853 | 11/2003 |
| EP | 1087309 A2 * | 3/2001 |

OTHER PUBLICATIONS

Hunter et al., "The Application of Metadata Standards to Video Indexing," Springer-Verlag Berline Heidelberg, 1998.*
Chen et al., "A Data Exchange Model between Hierarchical Databases and XML Documents," Department of Information Management Chaoyang University of Technology, May 2004.*
Auffret et al., "Audiovisual-based Hypermedia Authoring: using structured representations for efficient access to AV documents," ACM, 1999.*

* cited by examiner

*Primary Examiner* — Kuen S Lu
*Assistant Examiner* — Rachel J Lee
(74) *Attorney, Agent, or Firm* — Fitzpatrick, Cella, Harper & Scinto

(57) ABSTRACT

A method of retrieving a plurality of resource fragments from a audio-visual resource that is encoded using a hierarchical addressing model for the class of resources of which the audio-visual resource is a member is disclosed. The method comprises inputting a URI reference (1407) comprising a Universal Resource Identifier (1401) and a complex fragment identifier (1402) comprising a plurality of audio-visual resource specific location steps. Thereafter the method comprises a step of locating the audio-visual resource using the Universal Resource Name, and establishing (2023) a logical representation (2040) of the structure of the audio-visual resource. Then the method iteratively evaluates the fragment identifier location steps (1110) against the logical representation (2040) to resolve the complex fragment identifier (1402) into a set of explicit fragment references (1406) configured to explicitly address each of the plurality of resource fragments.

7 Claims, 16 Drawing Sheets

METHOD FOR EVALUATING XPATH-LIKE FRAGMENT IDENTIFIERS OF AUDIO-VISUAL CONTENT

FIELD OF THE INVENTION

The present invention relates generally to the retrieval of audio-visual data, and in particular, fragments of data from an audio-visual resource.

BACKGROUND

The advent of technology providing mass-market access to the Internet places vast amounts of on-line information within relatively easy reach. The World Wide Web (WWW) (hereunder, the Web) underpins much of the growth of Internet use, particularly because of the ease of use, and also due to the intuitive user interface presented by Web browsers. Universal Resource Identifiers (URIs) are a ubiquitous addressing feature used to locate target resources in the Web context. This is particularly relevant when Web pages are used in conjunction with a Common Gateway Interface (CGI) scripting application, which allows the Web page to become, in essence, the front end of a myriad of databases accessible over the Internet.

Notwithstanding the explosive progress described however, a Web user is, in most cases, unable to "drill down" beyond a certain level of data, and must, in many cases, down-load an inconveniently large and cumbersome amount of information in order to locate useful information. Illustrating this fact, consider investigating all flights from London to Moscow departing from Heathrow airport on a given date. In order to make a selection based on a number of criteria such as departure time, airline, number of stops and so on, a long list of flights typically needs to be down-loaded and scanned, either manually or using a back-end application on a local personal computer (PC).

Further exemplifying the problem, certain types of data such as, for example, audio-visual (AV) data, typically manifest themselves as monolithic blocks of information. The internal structure of such data, whether it be a particular video segment, or fragment, in a movie, or a specific movement in a symphony, is neither visible, nor addressable, or consequently accessible in terms of fragments.

Taking a more extreme example, off-line audio-visual data, in the form of celluloid film archives, paper-based libraries, and a wealth of other sources, are also not addressable, and are thus invisible and inaccessible at the "fragment" level. Although particular books can be located, by call number and location in a library, specific chapters thereof are not visible or addressable, and consequently, not accessible.

Extensible Markup Language (XML) provides a drill down capability for a limited sub-set of on-line information, namely information which is coded in XML. The overwhelming bulk of available information has been produced in other programming formats such as Hypertext Markup Language (HTML), or alternatively, is in hard copy form in physical archives and libraries. The aforementioned types of information are referred to as "legacy" information.

Australian Patent No. 759681 discloses an approach referred to as AV addressing (being a shorthand way of referring to audio-visual addressing) for addressing audio-visual fragments by constructing a logical model for the class of audio-visual resources of interest. In accordance with the EBNF syntax convention adopted at [42], this addressing scheme is also referred to as the "mp" addressing scheme.

The logical model is used to form a hierarchical representation of the audio-visual resource including a representation of the audio-visual fragment of interest. A fragment identifier is used in an addressing scheme that is capable of addressing fragments of the audio-visual resource. Evaluating an audio-visual fragment identifier can be difficult, however, as the disclosed approach does not deal with well-defined tokens of a single media format. Instead the approach is concerned with multiple media formats and logical units that are conceptual rather than physical in nature. Furthermore, the semantics of the disclosed audio-visual addressing scheme can lead to very complex expressions which are difficult to resolve.

SUMMARY

It is an object of the present invention to substantially overcome, or at least ameliorate, one or more disadvantages of existing arrangements.

According to a first aspect of the present disclosure, there is provided a method of retrieving a plurality of resource fragments from a audio-visual resource that is encoded using a hierarchical addressing model for the class of resources of which the audio-visual resource is a member, the method comprising the steps of:

inputting a URI reference comprising a Universal Resource Name and a complex fragment identifier comprising a plurality of audio-visual resource specific location steps;

locating the audio-visual resource using the Universal Resource Name;

establishing a logical representation of the structure of the audio-visual resource; and iteratively evaluating the fragment identifier location steps against the logical representation to resolve the complex fragment identifier into a set of explicit fragment references configured to explicitly address each of the plurality of resource fragments.

According to another aspect of the present disclosure, there is provided an apparatus for retrieving a plurality of resource fragments from a audio-visual resource that is encoded using a hierarchical addressing model for the class of resources of which the audio-visual resource is a member, the apparatus comprising:

means for inputting a URI reference comprising a Universal Resource Name and a complex fragment identifier comprising a plurality of audio-visual resource specific location steps;

means for locating the audio-visual resource using the Universal Resource Name;

means for establishing a logical representation of the structure of the audio-visual resource; and means for iteratively evaluating the fragment identifier location steps against the logical representation to resolve the complex fragment identifier into a set of explicit fragment references configured to explicitly address each of the plurality of resource fragments.

According to another aspect of the present disclosure, there is provided an apparatus for retrieving a plurality of resource fragments from a audio-visual resource that is encoded using a hierarchical addressing model for the class of resources of which the audio-visual resource is a member, the apparatus comprising:

a memory for storing a program; and a processor for executing the program, said program comprising:

code for inputting a URI reference comprising a Universal Resource Name and a complex fragment identifier comprising a plurality of audio-visual resource specific location steps;

code for locating the audio-visual resource using the Universal Resource Name;

code for establishing a logical representation of the structure of the audio-visual resource; and code for iteratively evaluating the fragment identifier location steps against the logical representation to resolve the complex fragment identifier into a set of explicit fragment references configured to explicitly address each of the plurality of resource fragments.

According to another aspect of the present disclosure, there is provided a computer program product including a computer readable medium having recorded thereon a computer program for directing a processor to execute a method for retrieving a plurality of resource fragments from a audio-visual resource that is encoded using a hierarchical addressing model for the class of resources of which the audio-visual resource is a member, the program comprising:

code for inputting a URI reference comprising a Universal Resource Name and a complex fragment identifier comprising a plurality of audio-visual resource specific location steps;

code for locating the audio-visual resource using the Universal Resource Name;

code for establishing a logical representation of the structure of the audio-visual resource; and code for iteratively evaluating the fragment identifier location steps against the logical representation to resolve the complex fragment identifier into a set of explicit fragment references configured to explicitly address each of the plurality of resource fragments.

Other aspects of the invention are also disclosed.

BRIEF DESCRIPTION OF THE DRAWINGS

One or more embodiments of the present invention will now be described with reference to the drawings and appendices, in which.

Figure 1:
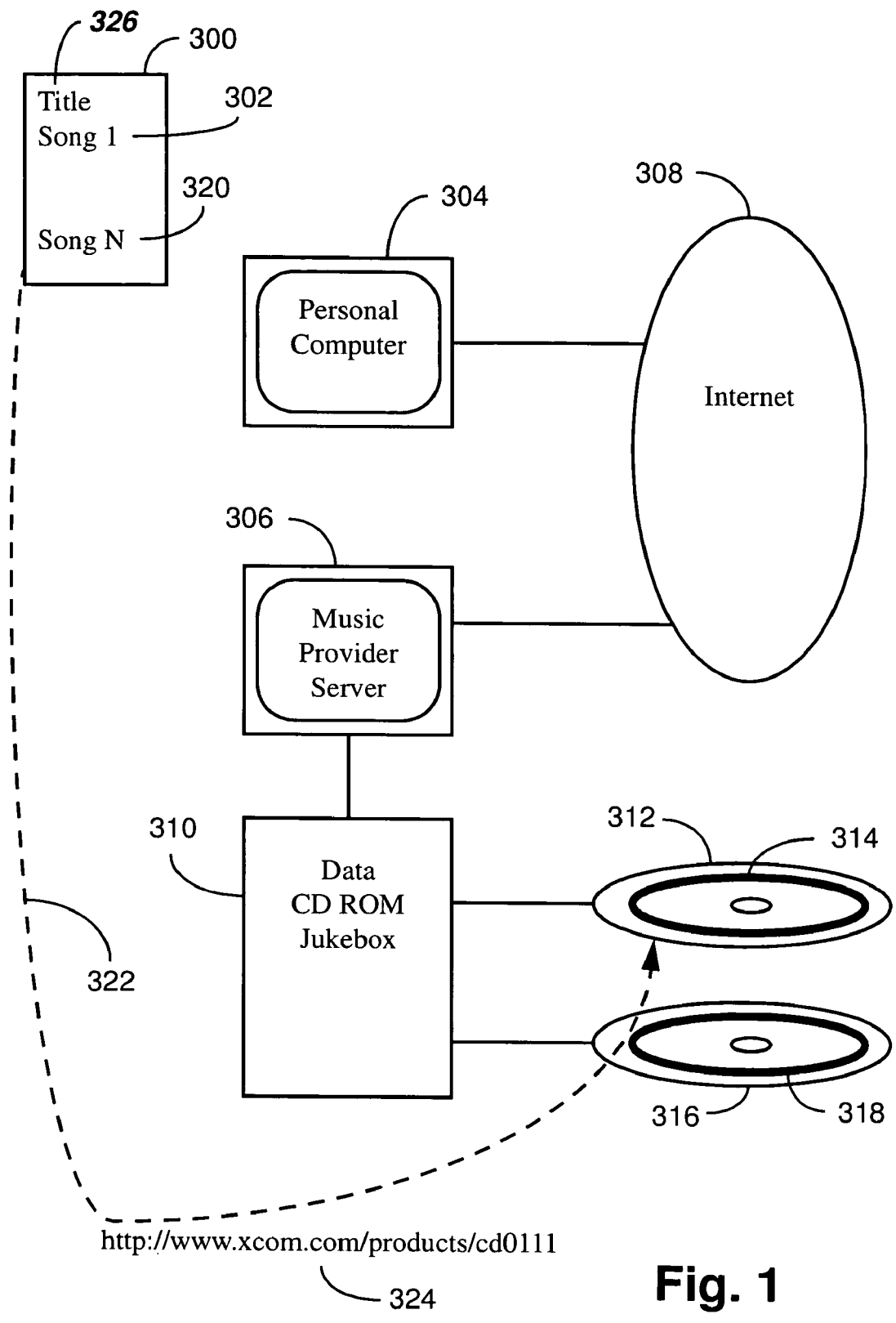
FIG. 1 depicts a prior art system for accessing audio data on a CD ROM using the Internet.

APPENDIX A presents examples of pre-defined logical (XML) models for CDAudio and DVD-Video; and APPENDIX B presents an example of meta-data for an Audio CD.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents which form public knowledge through their publication. Such should not be interpreted as a representation by the present inventor(s) or patent applicant that such documents or devices in any way form part of the common general knowledge in the art.

FIG. 1 depicts a prior art system used to locate an audio content CD ROM 312 using the Internet 308 as a vehicle. A user (not shown) uses a personal computer (PC) 304 which is connected to the Internet 308 in order to connect to the server 306 of an on-line music provider. The server 306 is connected to a CD ROM juke box 310 which houses a plurality of CD ROMs 312, 316. Each CD ROM 312, 316 contains individual songs exemplified, for illustrative purposes only, by bold lines 314, 318 respectively. The user has a paper description 300 of the desired CD ROM 312 containing a title 326 of the CD ROM, and also a list of the songs 302, 320. The user uses a Universal Resource Indicator (URI) 324 which "points" to the address of the CD ROM 312, and the user is able to download music from the CD ROM 312 over the system.

Figure 2:
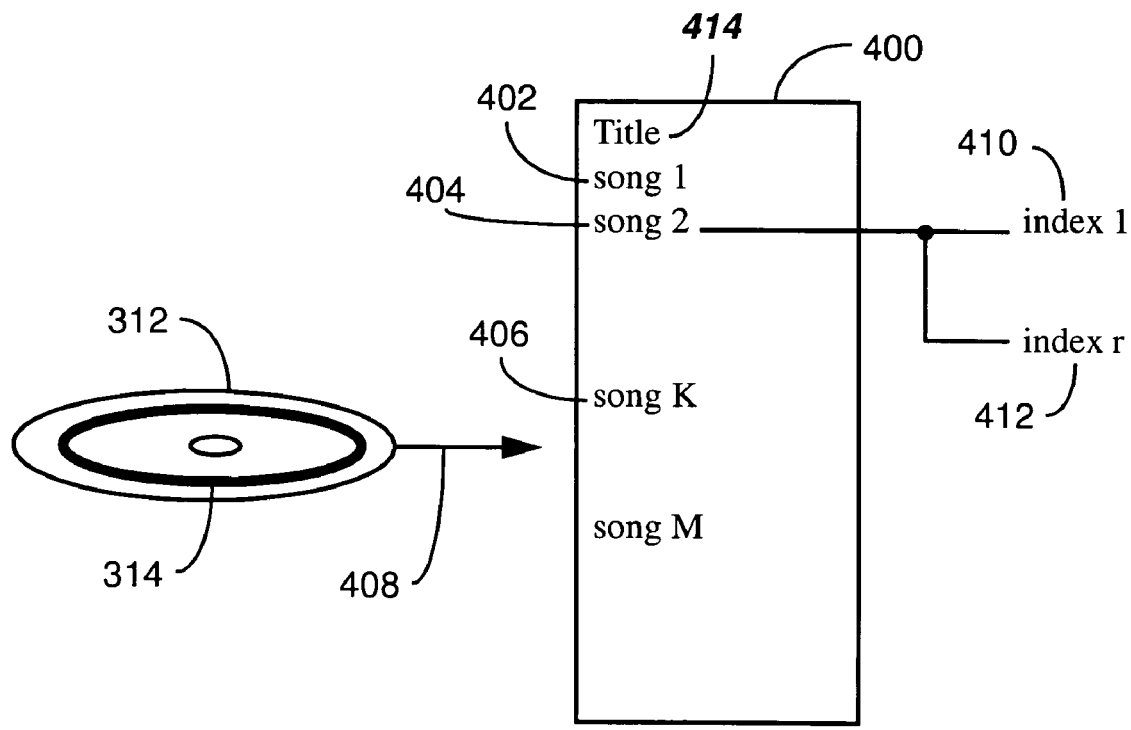
FIG. 2 illustrates indexing typically provided for a CD ROM according to FIG. 1.

In FIG. 2, the CD ROM 312 can be portrayed in a description 400 as containing a list of songs 402, 404 under a title 414, where the song 404 has indices 410 and 412 which point to particular segments within the song 404. Terminology such as "songs" is used for illustration in this part of the description, noting that in fact, as described, the audio content is actually stored on CD ROM as noted. For example in classical music where the "song" 402 can be an individual movement of a symphony, and therefore can be quite long, the index 1 (ie 410) can point to a trumpet solo, and the index r (ie 412) can point to a violin solo of interest. Depending upon the capabilities of the server 306 and juke box 310 in FIG. 1, the user can address the desired CD ROM 312, and address a desired index 410. It is noted however, with reference to both FIG. 1, and to FIG. 2, that the user is limited to addressing, and so accessing, material only down to the level of the particular CD (ie 312), or perhaps the specified predefined index (ie 410). It is not possible to "drill down" to an arbitrary further specified level of fine grain detail.

Figure 3:
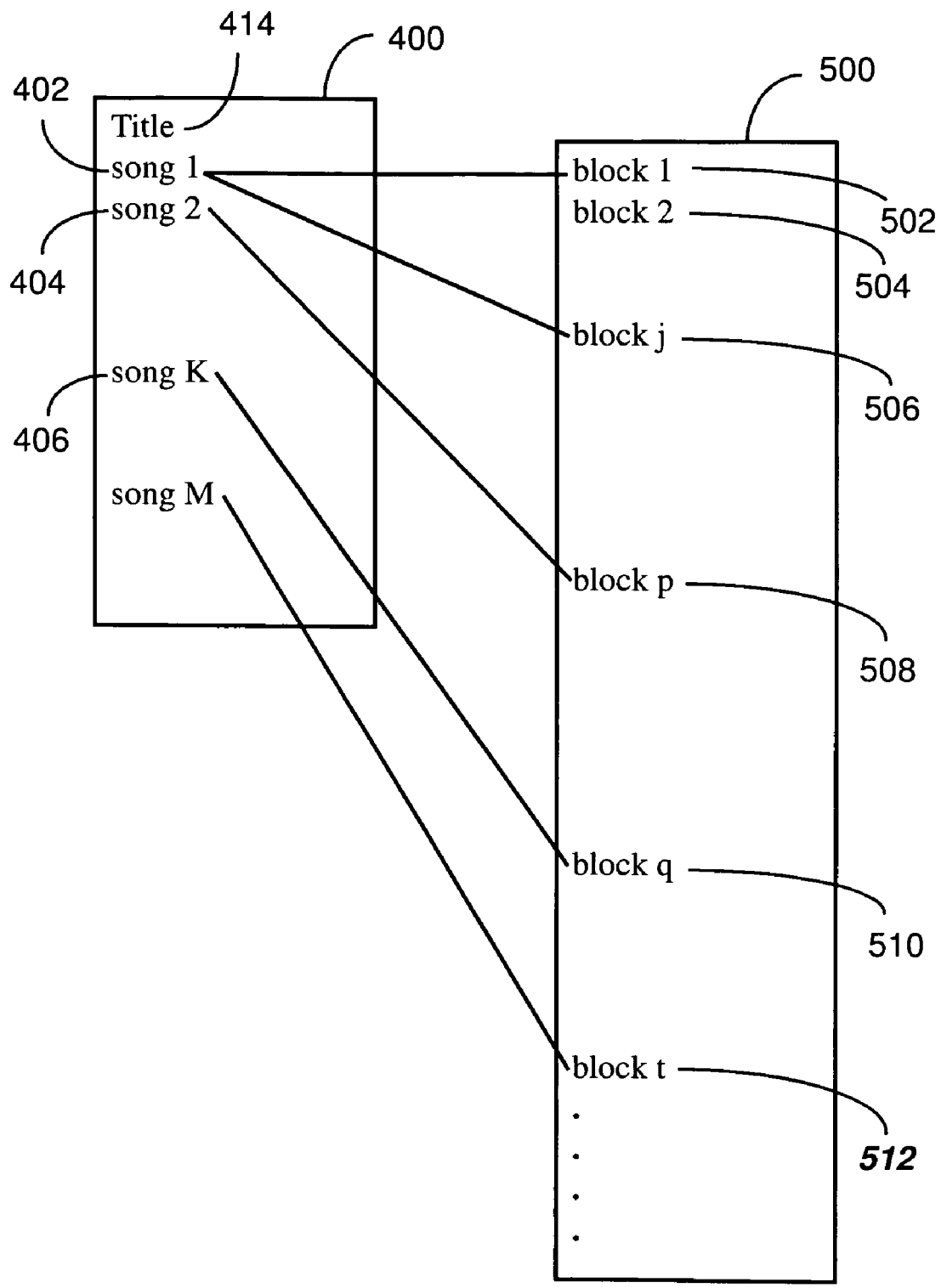
FIG. 3 depicts a version of the AV addressing method in relation to CD ROMs.

FIG. 3 depicts an illustrative embodiment of an AV addressing method, in this case to be used in relation to audio CD ROMs. The CD ROM 312, formerly described by the description 400 which contains a list of individual songs 402, each of which may contain a level of indexing (eg 410 see FIG. 2) is extended, using a logical model based upon consecutive time blocks or slices, and using a set of rules defining how the logical model is to be applied, into a hierarchical representation comprising both the description 400 and the further description 500 comprising time blocks 502 to 512. The logical model, when applied to the CD ROM 312, serves to form a hierarchical representation of the otherwise monolithic AV content of the CD ROM 312. The model thereby enables systematic and rapid addressing of arbitrary content fragments on a time block basis, and provides the desired arbitrary drill down capability. Using the described representation, a user is able, for example, to select an arbitrary fragment of audio content on the CD ROM 312 by specifying a fragment address, or fragment identifier, of the form "Title/song1/block2-block j", where j is an arbitrary index as shown in FIG. 3. The present logical model is used for illustrative purposes, and more advantageous logical models and addressing schemes are proposed later in the description. In FIG. 3 song 402 is shown to comprise blocks 502 to 506, song 2 comprising blocks from the block after 504 through to block 506 and so on.

Figure 4:
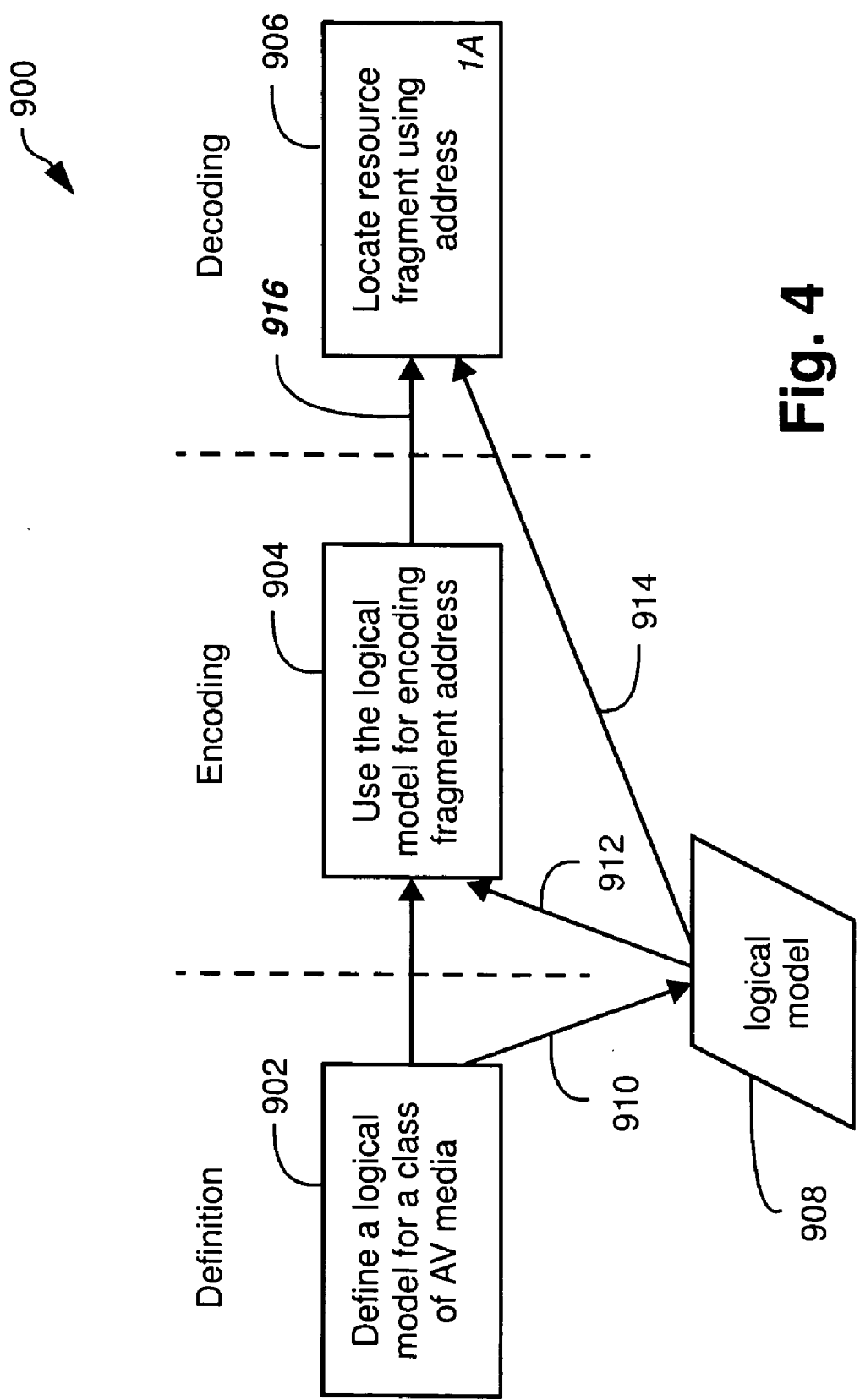
FIG. 4 shows a process for applying an audio-visual addressing scheme to locate fragments of audio-visual content.

FIG. 4 shows a process 900 for applying an audio-visual (ie AV) addressing scheme to locate fragments of audio-visual content. The process 900 comprises three sub-processes, namely a definition sub-process 902, an encoding sub-process 904, and a decoding sub-process 906. The definition sub-process 902 defines, as depicted by an arrow 910, a logical model 908 for a class of AV media. After the definition sub-process 902, the logical model 908 is used (as depicted by an arrow 912 ) in the encoding sub-process 904 for encoding an address for an audio-visual resource fragment belonging to the class of AV media. The logical model 908 is also used (as depicted by an arrow 914 ) for locating the audio-visual resource fragment that is associated with the address.

Figure 5:
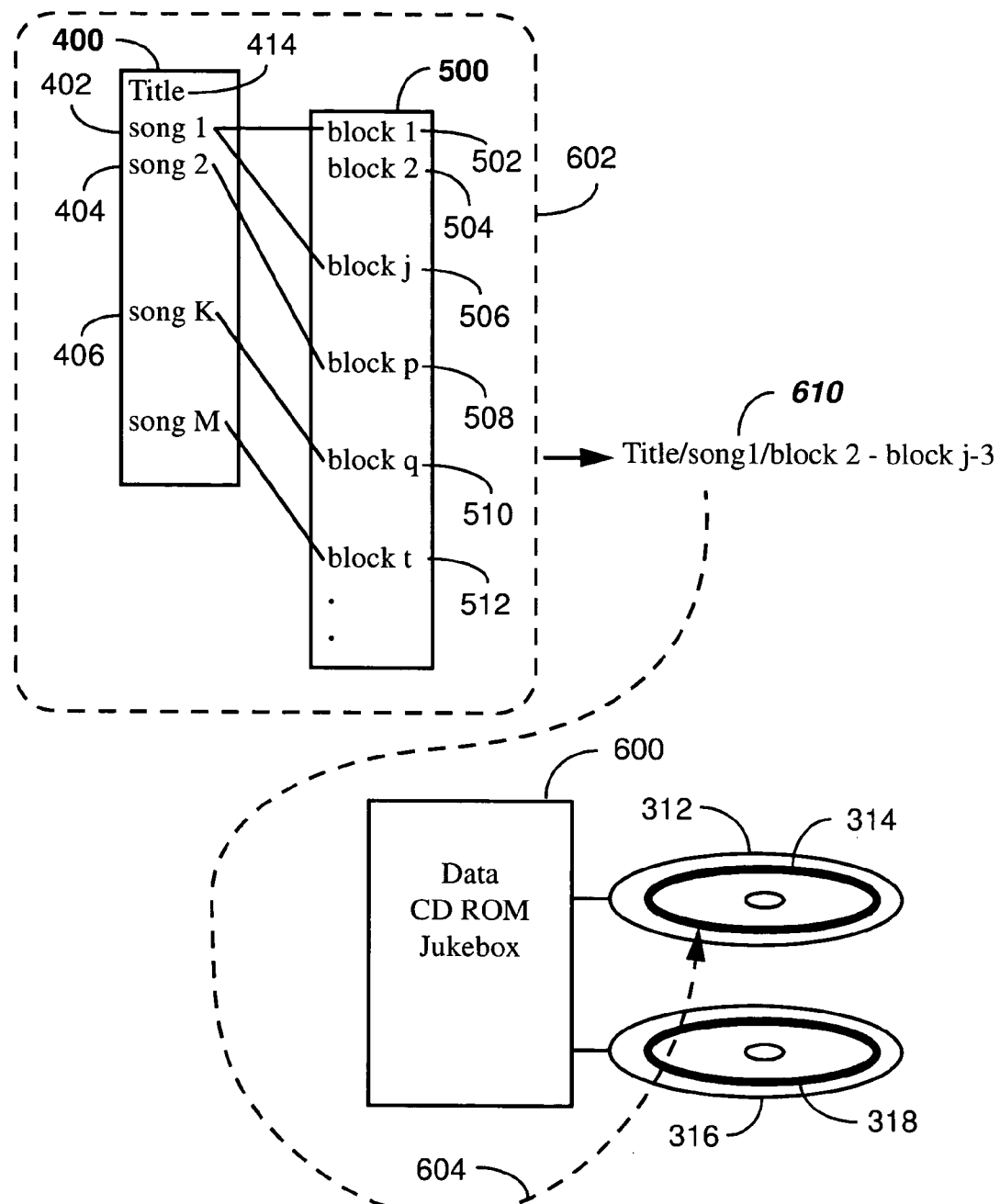
FIG. 5 illustrates application of the method in FIG. 3 to addressing a fragment of audio data on a CD ROM.

Turning to FIG. 5, the hierarchical representation 602, comprising descriptions 400 and 500, is shown in a system content in more detail. By using the fragment identifier 610, derived from the hierarchical representation 602, in conjunction with the URI 324 (see FIG. 1), an extended URI 606 (commonly referred to as a "URI reference" is shown to incorporate both the URI 324 described in relation to FIG. 1, and an additional fragment identifier 608. The URI reference can thus be used as an address to the CD 312, and further, to the desired fragment 314.

Figure 6:
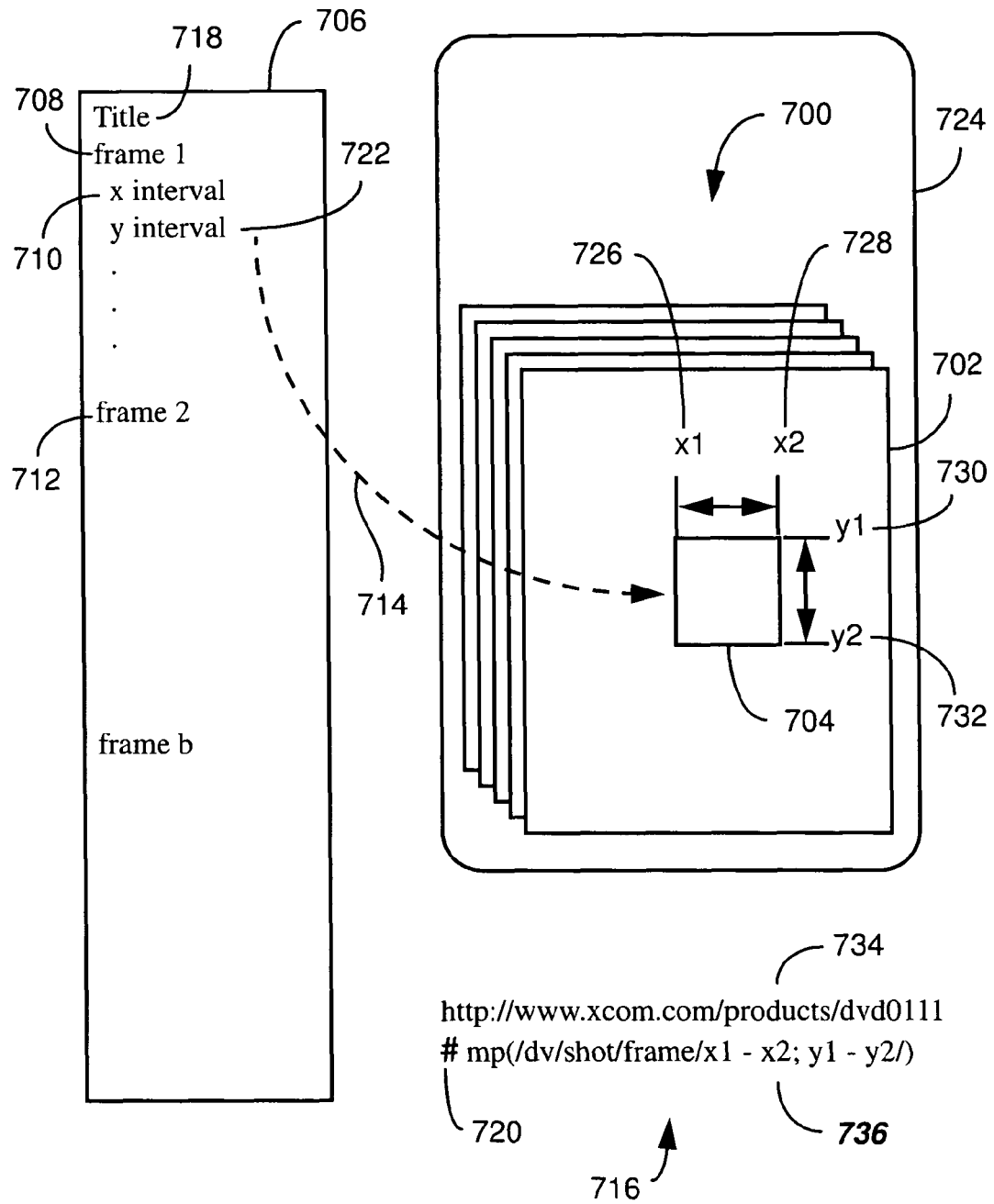
FIG. 6 depicts the preferred embodiment applied to addressing a fragment of digital video content on a CD ROM.

FIG. 6 depicts another hierarchical representation 706, determined using a logical model appropriate for digital video. In this example, a sequence of digital video shots 700 is recorded on a CD ROM 724. The logical model selected resolves the video sequence 700 into frames eg 708, each frame being further resolved into x intervals eg 710 and y intervals eg 722. This logical model is used for illustrative purposes, and more advantageous logical models are proposed later in the description. Using the described representation, a user is able, for example, to use an AV addressing scheme to select an arbitrary spatial fragment of video content on a specified frame of the CD ROM 724 by specifying a fragment address, or fragment identifier, of the form "Title/frame1/x1-x2; y1-y2". The x interval from x1 (726) to x2 (728) and the y interval from y1 (730) to y2 (732) address the spatial region 704 within the frame 702 in the set of digital video shots 700. The aforementioned technique can be extended to allow for spatial regions of arbitrary shape, rather than merely the rectangular region 704. The aforementioned x and y coordinates specify the shape of the region of interest, the spatial location within the frame 702, and the spatial extent (or size of the region). Furthermore, it is possible for the aforementioned coordinates to vary with time according, for example, to a predefined spatial transformation. The URI reference 716 therefore contains a URI portion 734 prior to the hash sign 720 which addresses the digital video disc 724, while the fragment identifier portion 736 after the hash sign 720 addresses the fragment 704.

The fragment of audio content specified by the fragment identifier "Title/song1/block 2-block j" (see 606 in FIG. 5) and the fragment of video content specified by the fragment identifier "Title/frame1/x1-x2; y1-y2 (see 704 in FIG. 6) are examples in which a fragment identifier returns a single audio-visual content fragment. More complex fragment identifiers can also be constructed, in which a single fragment identifier returns more than one audio-visual content fragment (eg see [8]-[11]).

Having provided an illustrative description of the disclosed AV addressing approach, a more detailed description is now provided. XML is utilised as a basis for describing a preferred arrangement of the disclosed AV addressing approach. This is both from the standpoint of conceptual and notational convenience, and also because XML has significant support as a recommendation in the context of the World Wide Web Consortium (W3C).

It is shown how in one arrangement the XML Path Language (XPath), can be extended and used in an AV addressing approach in order to locate fragments of non XML-based audio-visual content.

The XML Linking Language (XLink) uses URI's for locating objects. In principle, modified URIs can be used for locating any resource that has identity, for instance, an electronic document, an image, a service, a collection of other resources, a person, an corporation, or a bound book in a library. Each resource corresponds to an entity or set of entities in a conceptual model. URI's can therefore be used for locating or referencing resources other than XML documents. However, the XPath and XML Pointer Langauge (XPointer) schemes that XLink currently uses for addressing the internal structure of data objects can only be used to locate fragments of XML documents.

As an introduction, the use of XLink, XPointer, and XPath, are considered in the limited context of XML documents. XPath models an XML document as a tree of nodes. There are seven types of nodes, namely root nodes, element nodes, text nodes, attribute nodes, namespace nodes, processing instruction nodes and comment nodes. XPath uses a compact, non-XML syntax to facilitate the use of XPath within URI's. An XPath location path consists of a '/'-separated list of location steps. Each location step has the form:

$$\text{axis::node-test [predicate*]} \qquad [1]$$

where axis specifies the tree relationship between the nodes selected by the location step and the context node; node-test specifies the node type or the name; and predicate refines the set of nodes selected by the location step. A location step may specify one or more predicates each enclosed in a pair of square brackets. Boolean expressions of XPath functions and XPath location paths may be used in a predicate to further refine the set of nodes selected by the location step. Take the example of the absolute location path, /child::para [position( )=1], child is the name of the axis, para is the node test and [position( )=1] is a predicate that uses the XPath function position( ). As a second example, the relative location path para[attribute::type="warning"] selects all para children of the context node that have a type attribute with value "warning" and the expression para[attribute::type="warning"][5] selects the fifth para child of the context node that has a type attribute with value "warning".

A number of syntactic abbreviations allow common cases to be expressed concisely as follows:

@ is short for attribute::, e.g. attribute::type can be abbreviated as @type, [2]

//is short for/descendant-or-self::node( )/, [3]

. is short for self::node( ), and [4]

.. is short for parent::node( ). [5]

An axis specifies the tree relationship between the nodes selected by the location step and the context node. XPath axes include child, parent, descendant, ancestor, following-sibling, preceding-sibling, following, preceding, attribute, namespace, self descendant-or-self and ancestor-or-self The default is the child axis. XPointer extends XPath adding the string and range axes.

A node test specifies the node type or the name (such as the name of an element or an attribute) of the nodes selected by the location step.

There can be zero or more predicates for refining the set of nodes selected by the location step. Predicates are evaluated for each candidate location along the specified axis, and typically test the element type, attributes, positions, and/or other properties of the candidate nodes.

A function library provides a set of predicate functions such as count( ), position( ), id( ), last( ), etc. Each function takes zero or more arguments and returns a single result. Like XPointer, a new scheme can define new functions to extend the core functions of XPath.

Each location step is evaluated with respect to a context. The context is initially the document root, or more generally the results of a prior location step. The node set selected by the location step is the node set that results from generating an initial node set from the axis and node test, and then filtering that node-set by each of the predicates in turn.

Some examples of XPath location paths are as follows:

/doc/chapter[2]/section[3] [6]

selects the third section of the second chapter of doc chapter[contains(string(title), "Overview"] [7]

selects the chapter children of the context node that have one or more title children containing the text "Overview"

child::*[self::appendix or self::index] [8]

selects the appendix and index children of the context node child::*[self::chapter or self::appendix]
[position( )=first( )] [9]

selects the first chapter and appendix children of the context node para[@type="warning"] [10]

selects all para children of the context node that have a type attribute with value "warning":

para[@id] [11]

selects all the para children of the context node that have an id attribute.

XPath operates on the logical structure of an XML document, this logical structure being defined either explicitly by a Document Type Definition (DTD), or implicitly by arrangement of tags. For instance, the examples given in the previous section assumed an XML document with the structure, in Extended Backus-Naur Form (ENBF) as follows:

doc::=toc chapter+appendix*index [12]

chapter::=section+ [13]

section::=para+ [14]

appendix::=section+ [15]

where "toc" means "table of contents", "+" means "one or more, "*" means zero or more", and the composite description presented above describes, in expanded form, a document comprising a table of contents, one or more chapters, zero or more appendices, and an index, where each chapter comprises one or more sections, where each section comprises one or more paragraphs, and finally where each appendix comprises one or more sections.

In an XML document, each of these structures is marked by a pair of appropriately named tags. The tag markup allows the logical structure of the document to be determined unambiguously. Hence, any application that understands the syntax of XML can determine the location of the document's components. Any application that understands the XPath and XPointer notations can use an URI with an XPath/XPointer fragment identifier to locate parts of the document.

Audio-visual, or AV content, is not stored as XML documents and cannot be marked up. However, given an unambiguous logical structure, or model, a modified XPath location/addressing method (referred to herein as an AV addressing method) can be used. Hence, for each class of AV content, in the first instance, an unambiguous logical structure must be defined, and in order to make it widely accessible, the logical structure should preferably be published. By an unambiguous logical structure or model, it is meant that different persons and applications will segment given content in exactly the same way given the model.

Considering one type of AV content, for instance, Digital Video format as used by digital video cameras, this can be modelled as:

dv::=frame* [16]

where this means a digital video comprising one or more frames.

In the case, for example, where compatible digital video cameras generate meta-data to represent and record the instances the camera starts recording (designated a REC event), a shot can be defined as an interval between two REC event. In this case, the model for DV format is:

dv::=shot* [17]

shot::=frame+ [18]

meaning a digital video comprising zero or more shots, each shot comprising one or more frames.

As another example, the logical structure of Compact Disc Audio can be modelled as follows:

CDAudio::=track* [19]

track::=channel channel index* [20]

channel :=sample* [21]

meaning an audio CD comprising zero or more tracks, each track comprising two channels, and zero or more indices, and each channel comprising zero or more samples.

Considering a more complex example, consider Digital Video Disc, or DVD, video which can provide:
over 2 hours of high-quality digital video (over 8 on a double-sided, dual-layer disc), up to 8 tracks of digital audio, each with as many as 8 channels up to 32 subtitle/karaoke tracks up to 9 camera angles (different viewpoints) can be selected during playback up to 32 separate subpicture channels Other data types include Video Manager Information files, Video Title Set files, Program Chain Information files, still picture Video Objects, attributes for Title, Part_of_Titles, and Menus, Time Map Tables, Part_of_Title Search Pointers, and Navigation Commands.

DVD-Video content is broken into titles and chapters (or parts of titles). Titles are made up of cells linked together by one or more program chains (PGC). Individual cells can be used by more than one PGC. Different PGCs define different sequences through mostly the same material. Additional material for camera angles and branching is interleaved together in small chunks. The DVD player jumps from chunk to chunk, skipping over unused angles or branches, to stitch together the seamless video.

One logical model for DVD-Video is:

$$dvdVideo::=mainMenu? \text{ title* subpicture* file*} \qquad [22]$$

$$mainMenu::=menu* \qquad [23]$$

$$menu::=menu* \qquad [24]$$

$$title::=chapter+ \qquad [25]$$

$$chapter::=view+audio+subtitle* \qquad [26]$$

$$view::=frame+ \qquad [27]$$

$$audio::=channel+ \qquad [28]$$

$$channel::=sample+ \qquad [29]$$

The previous logical models each relate to a class of AV content, namely digital video, compact disc audio, and digital video disk. As noted, the application of the logical models to the associated AV content produces hierarchical representations of the AV content which supports addressing of fragments of the content. A more detailed description of the AV addressing approach is provided commencing at [42].

Turning to the aspect of addressing, each location step is evaluated with respect to a context. The context is initially the root node, dvdVideo in this case. In general, the context is the results of a prior location step. The node set selected by the location step is the node set that results from generating an initial node set from the axis and node test, and then filtering that node-set by each of the predicates in turn.

Figure 7:
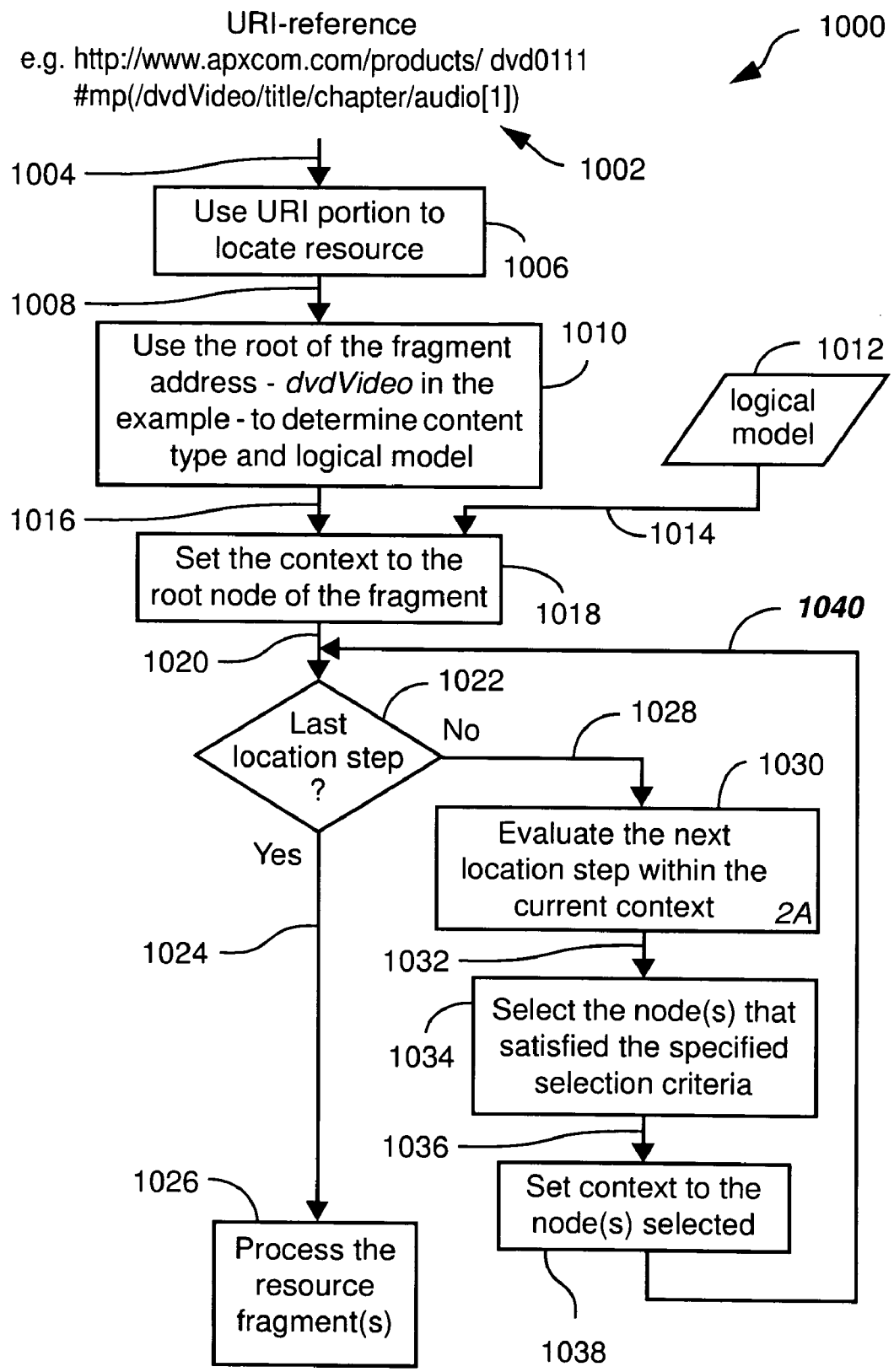
FIG. 7 shows a process for locating audio-visual fragments using the AV addressing scheme.

FIG. 7 shows a process 1000 for locating audio-visual fragments using the "mp" addressing scheme. For a more detailed description of the "mp" addressing scheme, see [42] onwards. This process 1000 depicts the decoding sub-process 906 in FIG. 4. A URI reference 1002 is provided, as depicted by an arrow 1004 which is equivalent to an arrow 916 in FIG. 4, to a step 1006. The URI reference 1002 has the following form:

$$(http://www.apxcom.com/products/dvd0111\#mp(/\\ dvdVideo/title/chapter/audio[1])) \qquad [30]$$

In the step 1006, the URI portion of the URI reference 1002 is used to locate a resource. The URI portion has the following form:

$$(http://www.apxcom.com/products/dvd0111) \qquad [31]$$

In a following step 1010, a root of the fragment address is used to determine a content type, and consequently, an associated logical model 1012 (which has already been defined in the definition sub-process 902 in FIG. 4). The root has the following form in the URI reference 1002:

$$dvdVideo \qquad [32]$$

In a following step 1018, the logical model 1012 (which is equivalent to the logical model 908 in FIG. 4) is used to set the initial context to the root node of the fragment.

Thereafter, a decision step 1022 determines whether the aforementioned steps have determined the last location step required to locate the desired resource fragment. If the last location step has been determined, the process 1000 is directed, according to a "YES" arrow 1024, to a step 1026 in which the located resource fragment is processed. The step 1026 is a post-location processing step.

If the decision step 1022 determines that the last location step has not been determined, then the process 1000 is directed, according to a "NO" arrow 1028, to a step 1030 which evaluates the next location step within the current context. This is described in more detail with reference to FIG. 8. Thereafter, in a step 1034, node(s) are selected that satisfy the specified selection criteria (see FIG. 8 for description of these criteria). In a following step 1038, the context is set to the node(s) selected, and the process 1000 is then directed, according to an arrow 1040, to the testing step 1022.

Figure 8:
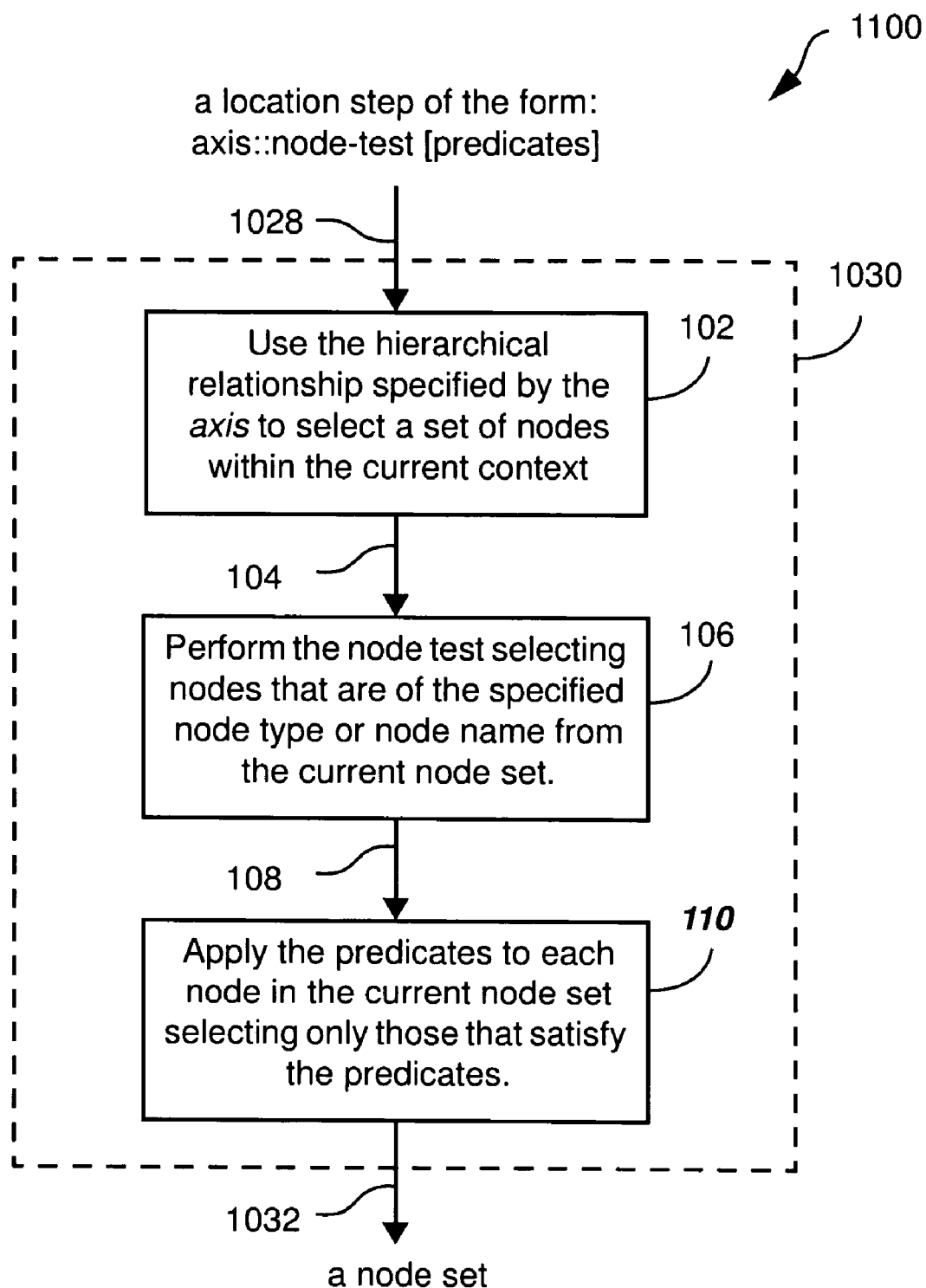
FIG. 8 shows a process for evaluating a location step in FIG. 7.

FIG. 8 shows a process 100 for evaluating the "evaluation of a location" step 1030, which is shown as a dashed box. The dashed box 1030 in FIG. 8 corresponds to the sub-process 1030 in FIG. 7. The step 1030 is a location step of the following form $$axis::node\text{-}test[predicates] \qquad [33]$$

In a first step 102 (which follows the decision step 1022 in FIG. 7 as depicted by the arrow 1028), a hierarchical relationship specified by the "axis" is used to select a set of nodes within the current context. Thereafter, in a step 106 the node test is performed, thereby selecting nodes that are of the specified node type or node name from the current node set. In a following step 110, the predicates are applied to each node in the current node set, selecting only those nodes that satisfy the predicates.

The described AV location scheme can, utilising a notation and mechanism similar to those of XPath/XPointer, locate analog and digital AV content within a database, or a plurality of databases.

A set of named functions are defined for the AV location scheme. For instance, the following function is used for determining whether the current context is within the specified time:

$$time(startTime\ [,endTime]) \qquad [34]$$

Furthermore, the following function is used for determining whether the current context is within the time specified by the start and end timecodes.

$$timecode(startTimecode\ [,endTimecode]) \qquad [35]$$

The functions can be used for evaluating expressions, the evaluation always occurring with respect to the current context.

In addition, new axes can be added, for instance, a time axis and a region axis for locating temporal and spatial segments of the data. The incorporation of these axes provides additional power to the concept of fragment addressing, and allows drilling down to different aspects of the AV content.

The temporal axis together with its time node-test selects, within the current context, components that occur within the specified start and end time. The current context is taken as starting at time zero and progressing continuously through time in normal play time. If the end time is not specified, it is taken to be the same as the start time and the component that occurs at or closest to the specified start time is selected.

TemporalLocationStep::=TemporalAxis ':' 'time' '('
    StartTime (',' EndTime)?')'  [36]

TemporalAxis::='temporal' |'~'  [37]

TimeNotation::=[0-9]+  [38]

StartTime::=TimeNotation  [39]

EndTime::=TimeNotation  [40]

For example, http://www.apxcom.com/products/dvd0111#mp(/dvd-Video/title[2]/~time(0,900))  [41]

selects the first 15 minutes the second title of the specified DVD. This example is designated example [41].

In example [41], the method works as shown in the following Table:

TABLE 1

Operation of the AV pointer [41]

| Selection step | | Meaning | Context after the selection step |
|---|---|---|---|
| axis | (default is child::) | all the children of the context node | all the children of the dvdVideo node, that is, all the mainMenu, title, subpicture and file nodes |
| node-test and predicate | Title[2] | any title node whose position is 2 | The $2^{nd}$ title nodes |
| axis | ~ | arrange the current selection continuously in time starting at time zero | Unchanged |
| node-test | time (0,900) | all content inside the time interval 0 sec to 900 sec (15 mm) | The first 15 minutes of the $2^{nd}$ title |

Figure 9:
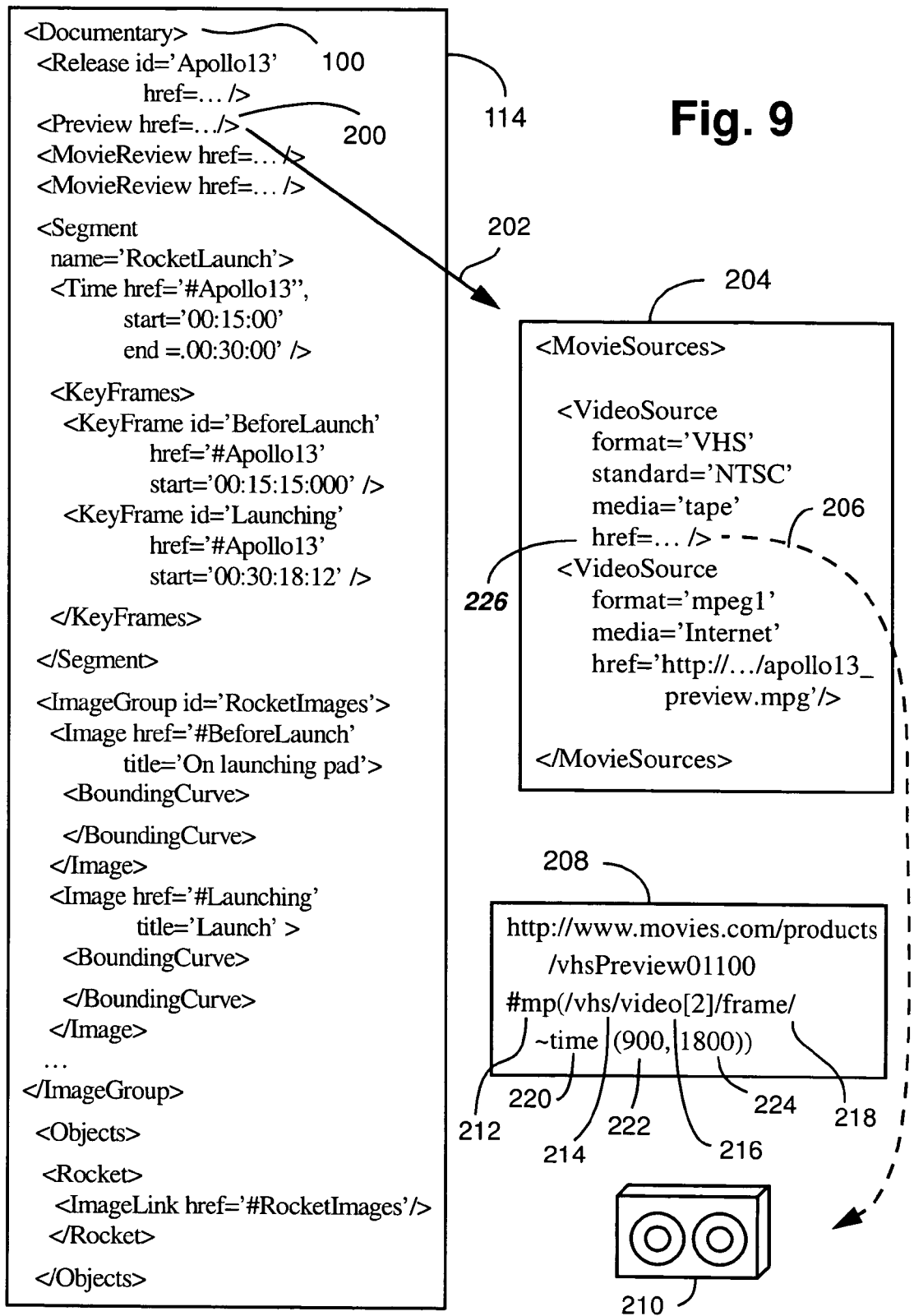
FIG. 9 illustrates use of extended URIs for fragment location according to the disclosed AV addressing approach.

Turning to FIG. 9, a preferred arrangement of the AV addressing method is described. Selection of the preview reference 200 on the main XML document 114 activates a link depicted by an arrow 202 which is directed to another XML document 204. This latter document 204 describes preview AV material at the fragment level, and selection of a reference 226 results in a link depicted by a dashed arrow 206 pointing to an AV fragment using an extended URI 208. The portion of the URI 208 before the hash relates to VHS Preview content designated "01100", which is a product of a fictitious company called "movies". The portion of the URI after the hash is an AV pointer 212, pointing to the second video 216 of the vhs (214) tape, and in particular to a segment (218) starting 900 seconds after the start of the documentary, and ending 1800 seconds after the start of the documentary.

Figure 10:
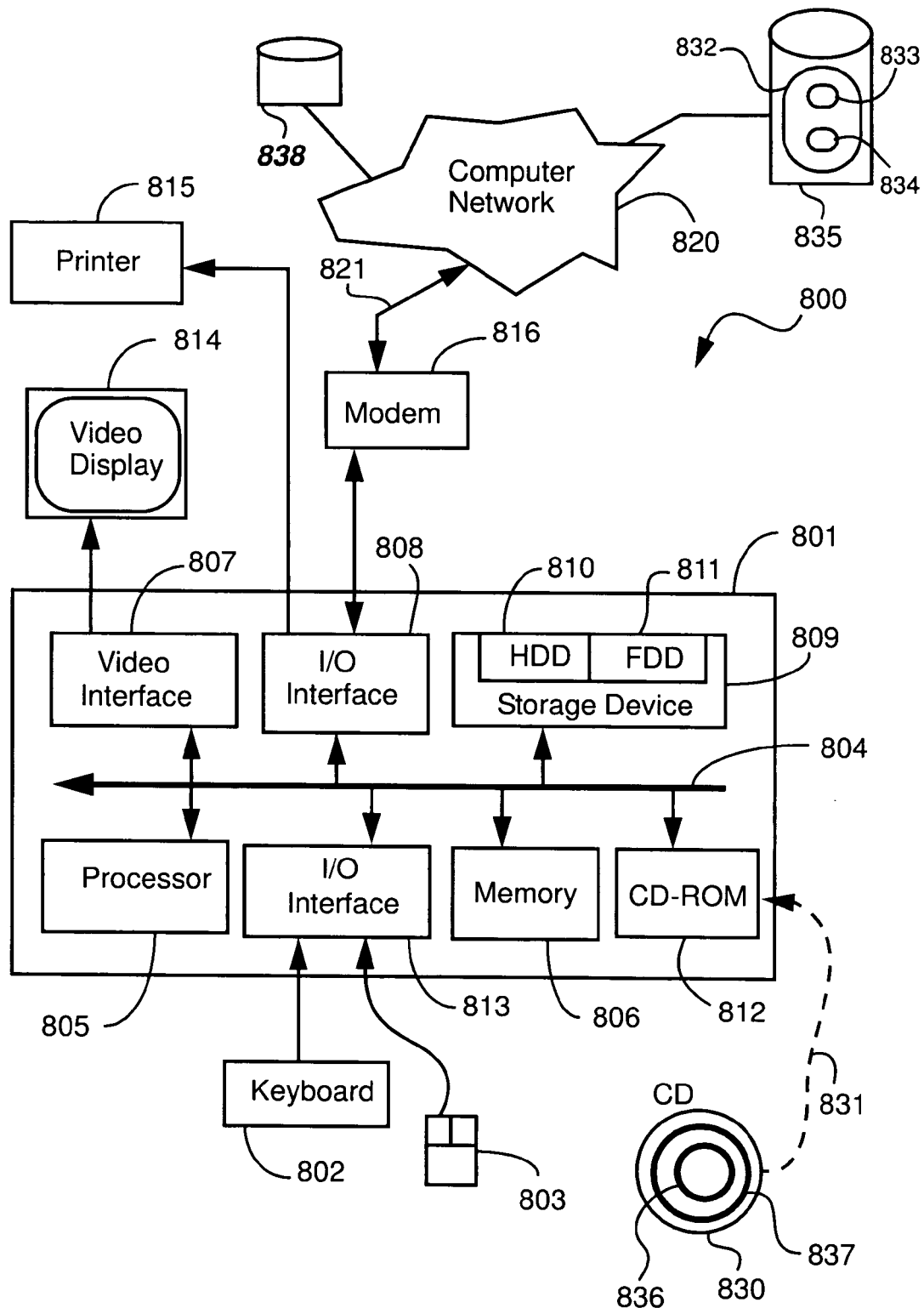
FIG. 10 is a schematic block diagram of a general purpose computer upon which the disclosed AV addressing arrangements can be practiced.

FIG. 10 shows how the method of addressing an arbitrary fragment of an AV resource is preferably practiced using a conventional general-purpose computer system 800, wherein the processes of FIGS. 4, 7-8, and 12-14 may be implemented as software, such as an application program executing within the computer system 800. In particular, the steps of the method of addressing an arbitrary fragment of an AV resource are effected by instructions in the software that are carried out by the computer. The software may be divided into two separate parts; one part for carrying out the addressing methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for addressing an arbitrary fragment of an AV resource in accordance with the disclosed arrangements.

The computer system 800 comprises a computer module 801, input devices such as a keyboard 802 and mouse 803, output devices including a printer 815 and a display device 814. A Modulator-Demodulator (Modem) transceiver device 816 is used by the computer module 801 for communicating to and from a communications network 820, for example connectable via a telephone line 821 or other functional medium. The modem 816 can be used to obtain access to the Internet, and other network systems, such as a Local Area Network (LAN) or a Wide Area Network (WAN). The computer module 801 can also access a remote jukebox 835 in this manner, where the juke box 835 contains a CD-ROM 832 containing two AV fragments 833, 834.

The computer module 801 typically includes at least one processor unit 805, a memory unit 806, for example formed from semiconductor random access memory (RAM) and read only memory (ROM), input/output (I/O) interfaces including a video interface 807, and an I/O interface 813 for the keyboard 802 and mouse 803 and optionally a joystick (not illustrated), and an interface 808 for the modem 816. A storage device 809 is provided and typically includes a hard disk drive 810 and a floppy disk drive 811. A magnetic tape drive (not illustrated) may also be used. A CD-ROM drive 812 is typically provided as a non-volatile source of data. The components 805 to 813 of the computer module 801, typically communicate via an interconnected bus 804 and in a manner which results in a conventional mode of operation of the computer system 800 known to those in the relevant art. Examples of computers on which the embodiments can be practised include IBM-PC's and compatibles, Sun Sparcstations or alike computer systems evolved therefrom.

Typically, the application program for AV addressing is resident on hard disk drive 810 and read and controlled in its execution by the processor 805. Intermediate storage of the program and any data fetched from the network 280 may be accomplished using the semiconductor memory 806, possibly in concert with the hard disk drive 810. In some instances, the application program may be supplied to the user encoded on a CD-ROM 830 or floppy disk and read via the corresponding drive 812 or 811, or alternatively may be read by the user from the network 820 via the modem device 8165. The CD-ROM 830 can also contain AV fragments 836, 837 which are referred to in relation to FIGS. 12, and 13. Still further, the softward can also be loaded into the computer system 800 from otehr computer readable medium including magnetic tape, a ROM or integrated circuit, a magento-optical disk, a computer readable card such as PCMCIA card, and the Internet and Internets including email transmissions and information recorded on websites and the like. The foregoing is merely exemplary of relevant computer readable mediums. Other computer readable mediums may be practiced without departing from the scope and spirit of the disclose addressing approach.

The method of addressing an arbitrary fragment of an AV resource may alternatively be implemented in dedicated hardware such as one or more integrated circuits performing the functions or sub functions of addressing. Such dedicated hardware may include graphic processors, digital signal processors, or one or more microprocessors and associated memories. The dedicated hardware described can be incorporated into specialised or general purpose equipment which addresses AV content.

Adoption of XML as a notation for describing the preferred AV addressing arrangements is a convenient mechanism for describing the arrangements. It also allows a consistent view and addressing mechanism for both XML and non-XML resources. As noted previously however, this is not an essential feature of the disclosed addressing techniques.

The disclosed AV addressing schemes are intended to provide a high level of functionality for addressing locations within an audiovisual resource. The AV addressing approach is based on W3C Recommendations XPath 1.0 and XPointer Framework and adds, to these standards, the ability to address
- temporal locations (a time point or range); and
- spatial locations (a point or region in space); and
- logical units (a syntax for specifying navigation steps through the logical model of an audiovisual resource).

The AV addressing scheme, also referred to as the "mp" audiovisual addressing scheme, is defined by the following EBNF syntax:

MediaPointer::=MediaPointerSchemeName "(" MediaPointerSchemeData ")"  [42]

MediaPointerSchemeName::="mp"  [43]

The MediaPointerSchemeData complies with the XPath abbreviated syntax. Therefore, it consists of a list of '/'-separated location steps defined as follows:

MediaPointerSchemeData::=LocationStep *  [44]

LocationStep::=AxisSpecifier "::" NodeTest Predicate*  [45]

Predicate::="[" PredicateExpression "]"  [46]

A LocationStep may contain one or several predicates to further refine the set of selected node. XPath defines a Core Function library that contains functions to be used in a predicate.

Moreover, the audiovisual addressing scheme defines an extension of the XPath Syntax, which consists of the additional axes, node-tests and functions, examples of which are shown in the following Table 2:

TABLE 2

Extensions to XPath Syntax

| Axis | | | |
| --- | --- | --- | --- |
| Syntax | Abbreviated syntax | Node-test | Function |
| temporal | ~ | TimeNodeTest | TimeFunction |
| spatial | ~ | RegionNodeTest | |
| | | VolumeNodeTest | |
| spatiotemporal | ~ | MovingRegionNodeTest | |

Some examples of URI-references that contain "mp" fragment identifiers are as follows:

aURItoIdentifyaDVD#mp(/dvdVideo/title[1]/chapter[2])  [47]

selects a fragment that corresponds to chapter two of title 1 of a DVD-Video, aURItoIdentifyanAudioCD#mp(/CDAudio/Track[3]/~time('30'))  [48]

selects a fragment that commences at a time point 30 seconds from the beginning of the third track of an Audio CD.

Considering a situation in which the AV resource 832 is located in the juke box 835 (see FIG. 10) that is accessible by the computer module 801 over the network 820, in order to locate fragments 833, 834 of the CD-ROM 835, the computer module 801 parses and evaluates the corresponding URI reference that contains a fragment identifier based upon the abovementioned audiovisual addressing scheme. The URI reference can be input into the computer module 801 using the keyboard 802, or can be provided to the computer module 801 over the network 820. When the fragment data contains location steps that select logical units of a logical model (eg 1012 in FIG. 7), the processor 805 has to resolve the location steps against the particular logical model. Evaluation fails if the logical model is unknown to the computer module 801.

While an audiovisual fragment identifier is similar to its XPath counterpart, evaluating an AV fragment identifier is more complex as the fragment identifier is not based upon the well-defined tokens (i.e. XML elements and attributes) of a single media format (i.e. XML). Instead AV addressing encompasses multiple media formats (text, audio, video and so on) and logical units that are conceptual rather than physical in nature. Furthermore, the semantics the AV addressing scheme inherited from XPath are very flexible and can thus lead to very complex expressions.

Figure 11:
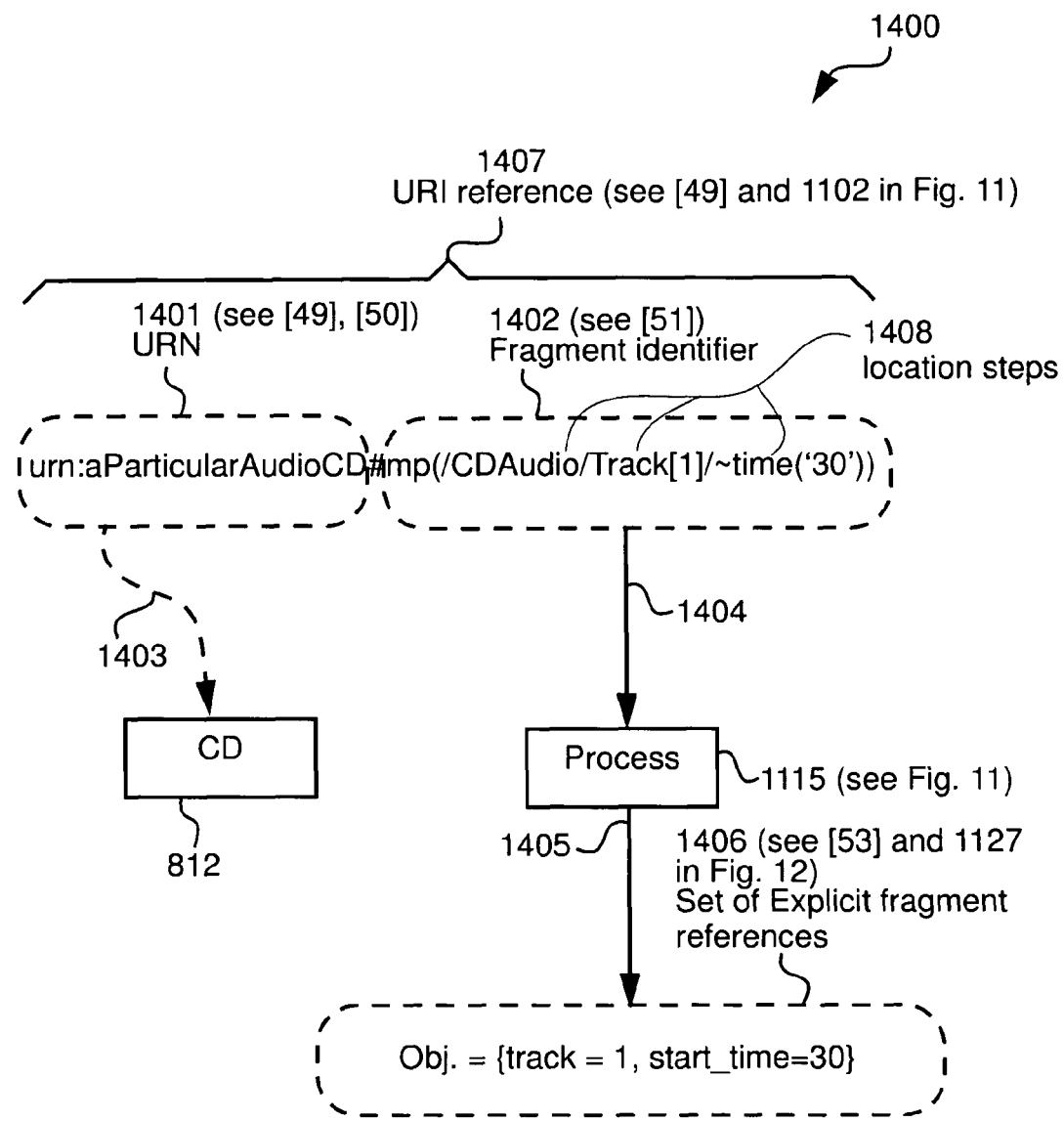
FIG. 11 shows a process in which an "explicit fragment reference" is derived from a URI having a fragment identifier.

FIG. 11 shows a process 1400 in which a set 1406 of "explicit fragment references" are derived from a fragment identifier 1402 of a URI-reference 1407. The term "fragment identifier" denotes the fundamental addressing element used in a URI reference to reference an AV fragment or AV fragments of a resource. The term "set of explicit fragment references" denotes an expression, defined in terms of XML elements or more generally in terms of software objects, that may be used to explicitly direct processes and/or devices to play or retrieve the plurality of desired AV fragment(s) addressed by the fragment identifier. The set of explicit fragment references can take a number of different, but functionally equivalent, forms depending upon the arrangement. Thus, in the arrangement described in relation to FIG. 14, the set of explicit fragment references takes the form of a set of selected XML elements (or selected node set) 2027. The process 1400 shows the URI reference 1407 (see [49]) comprising a Universal Resource Name (URN) 1401 (see [49] and [50]) and the fragment identifier 1402 (see [51]). The URN 1401 locates, as depicted by a dashed arrow 1403, a CD 830 found in the CD drive 812 (see FIG. 10). The fragment identifier 1402 is processed, in the case shown in FIG. 12, by a process 1110 (see FIG. 12) to produce, as depicted by an arrow 1405, a set 1406 of explicit fragment references (see [53]). This is described in more detail in regard to FIGS. 12 and 13.

Figure 12:
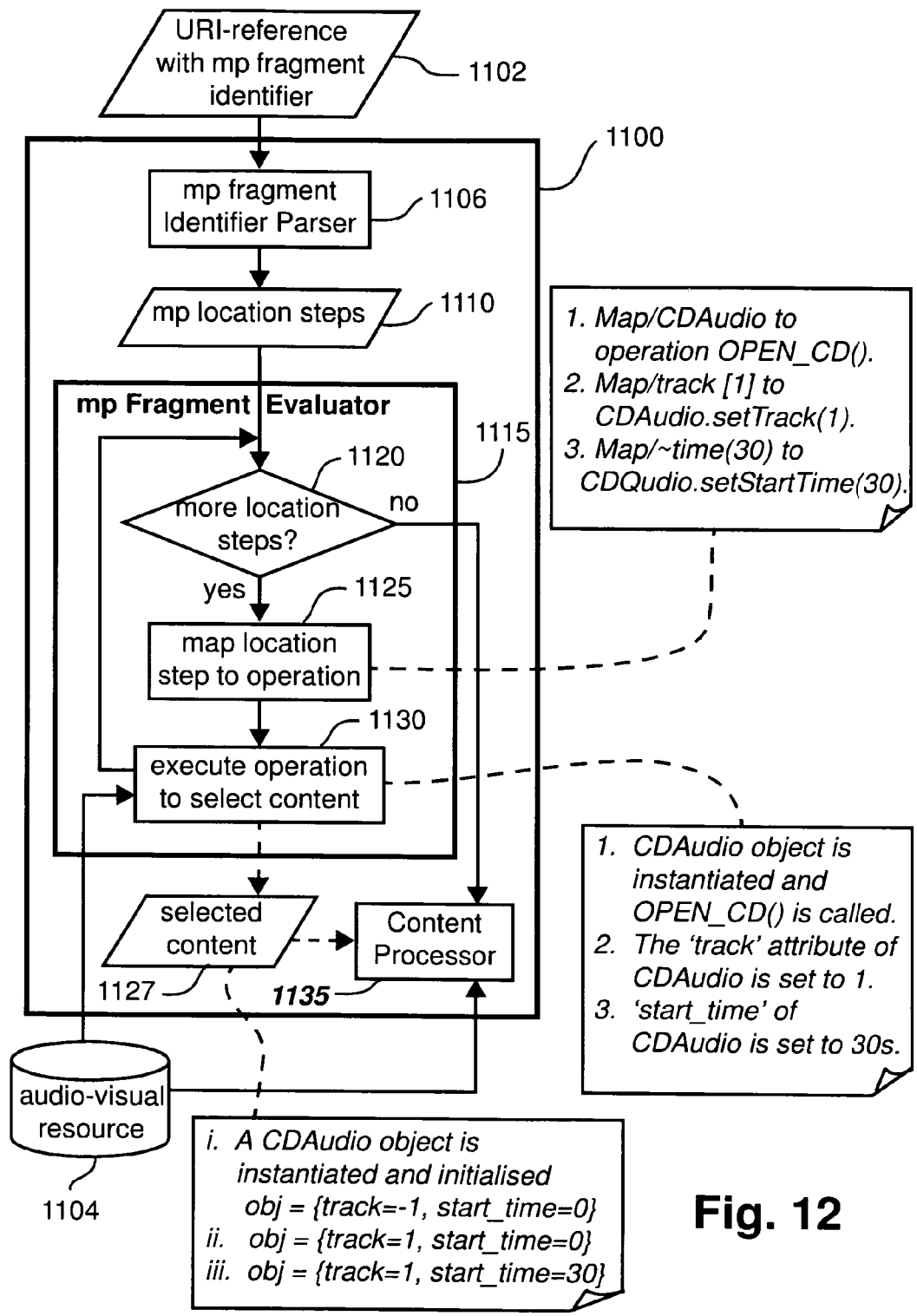
FIG. 12 shows a process and data flow diagram for a first arrangement for resolving URI references containing AV fragment identifiers.

FIG. 12 shows a process and data flow diagram for a first arrangement for evaluating and processing "mp" audio-visual fragments containing logical units. A URI reference 1102 which includes an "mp" fragment identifier, is to be used to retrieve the one or more fragments 836, 837 of the CD 830 in the local CD drive 812 of the computer module 801 in FIG. 10. As previously noted, a general fragment identifier can return a single audio-visual content fragment 836, or more than one audio-visual content fragment 836, 837. The URI part of the URI reference 1102 is used to locate the CD 830 in the CD drive 812, and an explicit fragment reference 1127 is initialised, in the first instance, to point to the entire CD 830 which is an AV resource which is a super-set of the desired AV resource fragments 836, 837.

The process 1100 has an "mp" Fragment Parser 1106 that parses the "mp" fragment identifier 1102 into a sequence of location steps 1110. After testing in a step 1120 whether there are any further location steps to process, and if the step 1120 returns a "YES", then an "mp" Fragment Evaluator 1115 evaluates the next location step in the sequence 1110. For each location step, the evaluator 1115 first maps, in a step 1125, the location step to computational operations or basic system operations that control devices and handle media data. Thus, in the present example, and as shown in FIG. 12, the step 1125 maps, in a first step, /CDAudio to operation OPEN_CD( ), maps, in a second step, /track[1] to CDAudio.setTrack(1), and maps, in a third step, /~time(30) to CDAudio.setStartTime(30). The evaluator 1115 then evaluates, in a step 1130, the effect of the aforementioned operation(s), as they relate to the content currently referenced by an explicit fragment reference 1127, to thereby refine the set of explicit fragment references 1127. Thus, in the present example, and as shown in FIG. 12, the step 1130, in a first step, instantiates CDAudio object and calls OPEN_CD( ), the step 1130, in a second step, sets the 'track' attribute of CDAudio to 1, and the step 1130, in a third step, sets 'start_time' of CDAudio to 30 s. The explicit fragment reference 1127 is thus updated each time the process loops through the steps 1120, 1125 and 1130. Accordingly, in the present example and as shown in FIG. 12, the step 1127, in a first step, instantiates and initializes a CDAudio object as follows:

Obj={track=−1, start_time=0}

The step 1127, in a second step, effects the following:

Obj={track=1, start_time=0}

The step 1127, in a third step, effects the following:

Obj={track=1, start_time=30}

The process 1100 then returns to the step 1120. After all the location steps of 1110 have been processed, the process is directed by a "NO" arrow from the step 1120 to the content processing step 1135, which processes the desired content referenced by the explicit fragment reference 1127.

Figure 13:
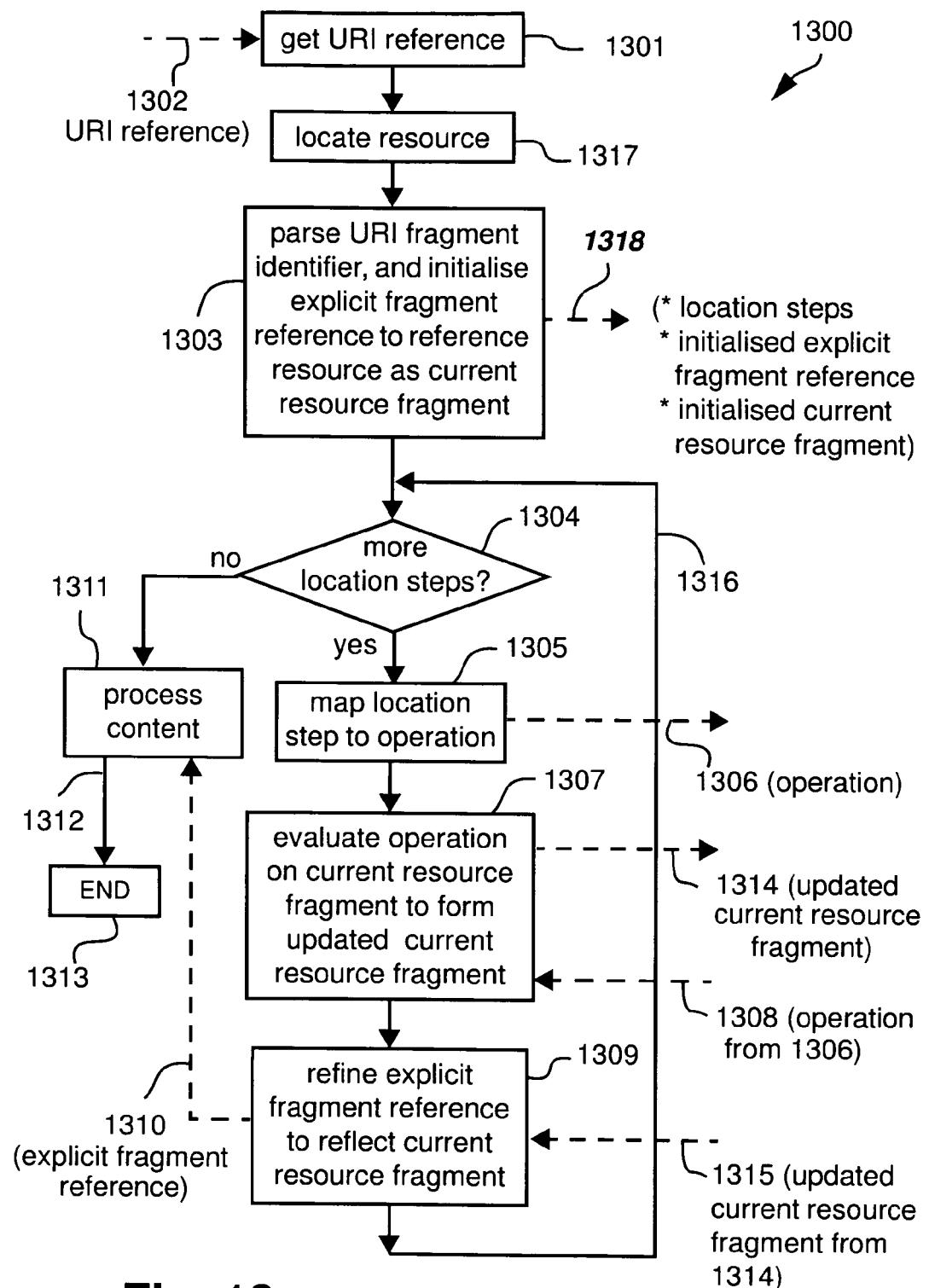
FIG. 13 shows a process flow for the arrangement of FIG. 12.

FIG. 13 is a process flow diagram of a process 1300 for evaluating and processing "mp" audio-visual fragments containing logical units according to the arrangement in FIG. 12. A first step 1301 receives a URI reference such as [49] at 1302 which contains an "mp" fragment identifier [51]. The AV reference [49] refers, for example, to the track 836 on the CD 830 in the local CD drive 812. The CD drive 812 has an associated URI [50]. A following step 1317 locates the resource according to the URI part (see [50]) of the URI reference [49], after which a step 1303 parses the URI fragment identifier [51] into a series of corresponding location steps at 1318 (see [52]). The step 1303 also initialises a "current resource fragment" to be the resource located in the step 1317 (which is the CD 830 in the CD drive 812 in this example). The step 1303 also initialises an "explicit fragment reference" to reference the "current resource fragment". The resource referenced by the explicit fragment reference at any time is referred to as the current resource fragment. A following step 1304 determines if there are any unprocessed location steps remaining from the series [52]. If this is the case then the process proceeds according to a "YES" arrow to a step 1305 that maps a relevant location step such as CDAudio from [52] against an appropriate operation from [53] thereby selecting, as depicted by 1306, a corresponding operation such as OPEN_CD (driveId). The available operations are set out in Table 3. A subsequent step 1307 evaluates the effect of applying the selected operation 1306 (ie OPEN_CD (driveId)), this being provided at 1308, to the current resource fragment (which is the CD drive 812 in this example) to consequently output at 1314 an updated "current resource fragment" (the entire CD). A following step 1309 receives the aforementioned updated "current resource fragment" at 1315 and refines the explicit fragment reference to reflect the updated "current resource fragment". Thereafter the process 1300 returns according to 1316 to the step 1304. When no more location steps are available according to the step 1304, the process is directed by a "NO" arrow from the step 1304 to a step 1311 which processes the content using the finally updated explicit fragment reference received at 1310. The process 1300 then terminates at a step 1313.

FIG. 12 thus is concerned with an example in which a consumer device (such as a CD player, more particularly the CD drive 812 in FIG. 10 in the present example) is passed a URI reference 1102 of the following form:

urn:aParticularAudioCD#mp(/CDAudio/Track[1]/~time('30'))　　　　　　　　[49]

The aforementioned URI reference uses an URN (Universal Resource Name) to reference the content which in this case is the (Audio) CD 830. The URI reference also includes an "mp" fragment identifier for retrieving and playing, say, the fragment 836 of the (Audio) CD 830.

The basic operations in the following table are supported by the system 800 in regard to the CD drive 812:

TABLE 3

| Basic Operations supported by local CD drive | |
|---|---|
| Basic System Operations | Functions |
| OPEN_CD (driveId) | Open the CD in drive with ID driveId. |
| GET_TOC (CD_Id) | Retrieve information about the content of an opened CD |
| PLAY_CD (offset, [length]) | Play an Audio CD starting at a time offset second from the start of Audio CD for a length of time length second. |
| PLAY_TRACK (trackNumber, offset, [length]) | Play a track of an Audio CD starting at a time point offset second from the start of the track for a length of time length second |
| SKIP_TRACK ( ) | Jump to the next track. |

Then, in the step 1106 of FIG. 12, the "mp" Fragment Identifier Parser parses the following fragment identifier:

mp(/CDAudio/Track[1]/~time('30'))　　　　　　　　[51]

The aforementioned parsing operation produces the following location steps:
CDAudio Track[1]　　　　　　　　[52]

~time('30')

In the step 1125, the "mp" Fragment Evaluator 1115 maps the location steps CDAudio, Track[1] and ~time('30'), respectively to the following operations:
OPEN_CD(driveId)

set the track number parameter to 1　　　　　　　　[53]

set the time offset parameter to 30 s and the length parameter to 0 (which means the end of the logical unit—track 1, in this case—selected in the previous step).

The step 1130 evaluates the effect of executing the relevant operations [53] to thereby update an explicit fragment reference. After all the location steps have been evaluated, each location step having the effect of updating the explicit fragment reference, the Content Processor 1135 is directed by the explicit fragment reference to call the operation PLAY_TRACK (1, 30) to play the required temporal fragment of track 1 of the CD.

The above approach is preferably used only where simple or a small number of "mp" expressions need to be supported. This is mainly due to the fact that the use of predicates in XPath and, hence, "mp" expressions is extremely flexible and predicate functions can be combined in a large number ways. As an illustration of this complexity, the following "mp" fragment identifier can be specified (the fragment identifier [54] is shown in three segments but actually constitutes a single string):

mp(/CDAudio/Track[type="audio"] [54]
[(position( )=1 or position( )=last( )) or preceding-sibling::Track[1]
[contains(@name,"introduction")]]/~time('0', '30'))

which select the first 30 seconds of the first audio track, the last audio track and any audio track that follows an audio track whose name has the word "introduction" in it. In this example, it is difficult to map location steps directly to computational and system operations to handle complicated "mp" expressions. Moreover, with this particular approach, extensions to the Audiovisual addressing scheme syntax or the logical model of the resource (which are not uncommon) may require significant changes to be made to the mapping used by the evaluator.

Accordingly, the "equivalent document approach", instead of mapping location steps to a sequence of computational or system operations, first constructs an XML model (or an equivalent logical representation) of the structure of the resource being addressed (such as the CD 830 in FIG. 10), and then evaluates the "mp" expression against the XML model using an extended XPath evaluator. The extended XPath evaluator implemented new node-tests and predicate functions to support the spatio-temporal axes of the "mp" Audio-visual Addressing Scheme.

Figure 14A:
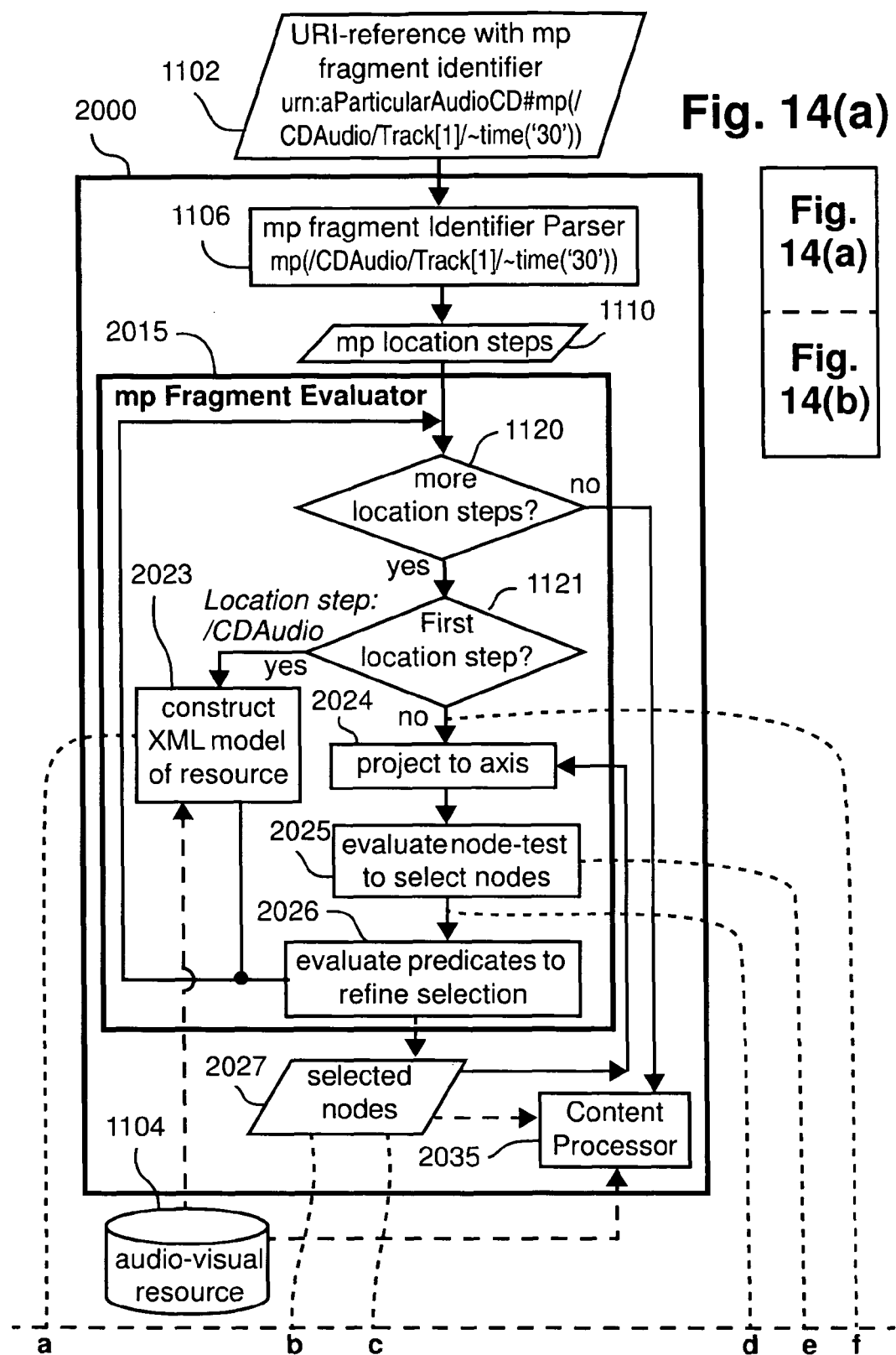
FIG. 14 shows a process and data flow diagram for an arrangement based on the equivalent document approach for resolving URI references containing AV fragment identifiers.
Figure 14B:
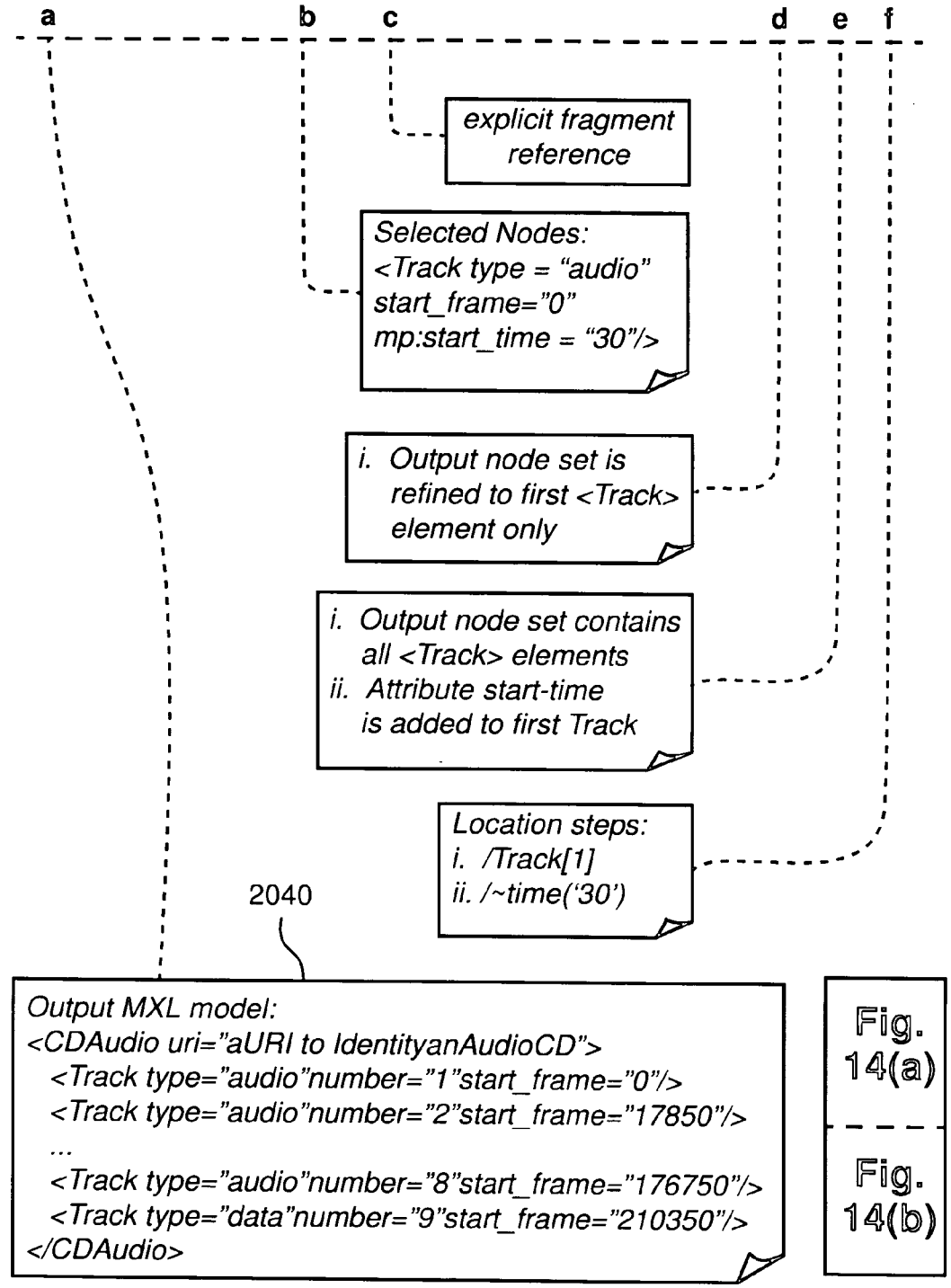

FIG. 14 shows a process and data flow diagram 2000 for an arrangement based on the equivalent document approach for resolving URI references containing "mp" audio-visual fragments. The following URI reference 1102 (see FIG. 12) is provided:

urn:aParticularAudioCD#mp(/CDAudio/Track[1/~
time('30')) [54A]

The URI reference 1102 includes the following "mp" fragment identifier:

mp(/CDAudio/Track[1]/~time('30')) [54B]

which is used to retrieve a fragment of the audiovisual resource 1104. The URI reference 1100 (see [54A]) has the following URI part:

urn:aParticularAudioCD [54C]

which is used to locate the resource 1104. The process 2000 has the "mp" Fragment Parser 1106 that parses the "mp" fragment identifier [54B] into the sequence of location steps 1110.

Thereafter, an "mp" Fragment Evaluator 2015 evaluates each location step 1110 in turn after firstly initializing the selected node set 2027 to an XPath node that represents the entire resource 1104. The aforementioned selected node set 2027 serves as a set of explicit fragment references and is equivalent to the explicit fragment reference of 1127 in FIG. 12.

Considering the "mp" evaluator step 2015, a first decision sub-step 1120 checks whether any more location steps 1110 are available for processing. If the answer is "YES" then the process proceeds according to a "YES" arrow to a step 1121. The step 1121 tests the whether the location step being considered is the first location step. If this is the case, then the process follows a "YES" arrow to a step 2023 which constructs an XML model 2040 of the resource 1104 which is referenced by the first location step. The step 2023 firstly determines whether the first (ie the "root") location step has a spatio-temporal axis (indicating that the resource being referenced by the URI 1102 is an audio-visual resource) or a non-spatio-temporal axis (indicating that the resource being referenced by the URI 1102 is not an audio-visual resource). If the root location step has a non-spatio-temporal axis, then the resource 1104 is deemed to be associated with a pre-defined logical model stored, for example, in a database 838 (see FIG. 10). Examples of pre-defined logical models for CDAudio and DVD-Video are presented in APPENDIX A. Such pre-defined logical models are typically industry-standards set, for example, by the record and film industry. If, on the other hand, the root location step is a spatio-temporal axis, then a logical model for the resource 1104 is determined, by inference, from the resource URI 1102 and from meta-data associated with the resource 1104. An example of meta-data for an Audio CD is presented in APPENDIX B. Accordingly, if the root location step has a spatio-temporal axis, the step 2023 collects, from meta-data on the resource or associated with the resource 1104 and stored, for example, in the database 838 (see FIG. 10), information that is relevant to the proposed logical model for the resource 1104. The step 2023 uses this collected information to construct the XML representation 2040 of the resource 1104.

Therefore in summary, the step 2023 provides the logical model 2040 for the resource 1104, this model being either pre-defined if the root location step is non-spatio-temporal, or inferred from the URI of the resource or from meta-data associated with the resource 1104 if the root location step is spatio-temporal.

Thereafter, for each location step (apart from the first step) and in a manner similar to that used in a typical XPath evaluator, the evaluator 2015 projects, in a step 2024, the currently selected node set 2027 to the axis specified by the location step. Thereafter, a step 2025 evaluates the node test to select the nodes' projections on the new axis. For the present example [54A] the selected node set 2027 initially contains all <Track> elements. The step 2025 adds the Attribute start_time to the first track. Following the step 2025, the selected node set has been refined to a first <Track> element only. A following step 2026 evaluates the predicates one by one to refine the selected node set.

In the case of spatio-temporal axes it is impractical to define the XML elements to the level required to represent discrete time units as well as pixels and voxels. In order to address this issue, the steps 2025 and 2026 which respectively perform spatio-temporal node-tests and predicate evaluations add special attributes to the selected node set 2027 of the XML model to provide the desired degree of resolution in the spatio-temporal dimensions.

In an alternate arrangement, instead of adding special attributes, special child elements may be added to serve the same function.

For example, a StartTime child element may be added to a Track element as follows:

```
<Track type="audio" number="1" start_frame="0">                    [55]
    <StartTime>30</StartTime>
</Track>
```

However, the added child elements may interfere with subsequent location steps. For instance, if the following location step selects all the child nodes of each of the currently selected nodes, then the added child elements will be selected as well unless the evaluator ignores all elements added by the evaluator. This approach adds complexity to the evaluator and, hence, is not preferred.

After all the location steps 1110 have been processed, the final set of selected nodes 2027 is processed by the Content Processor 2035.

Figure 15:
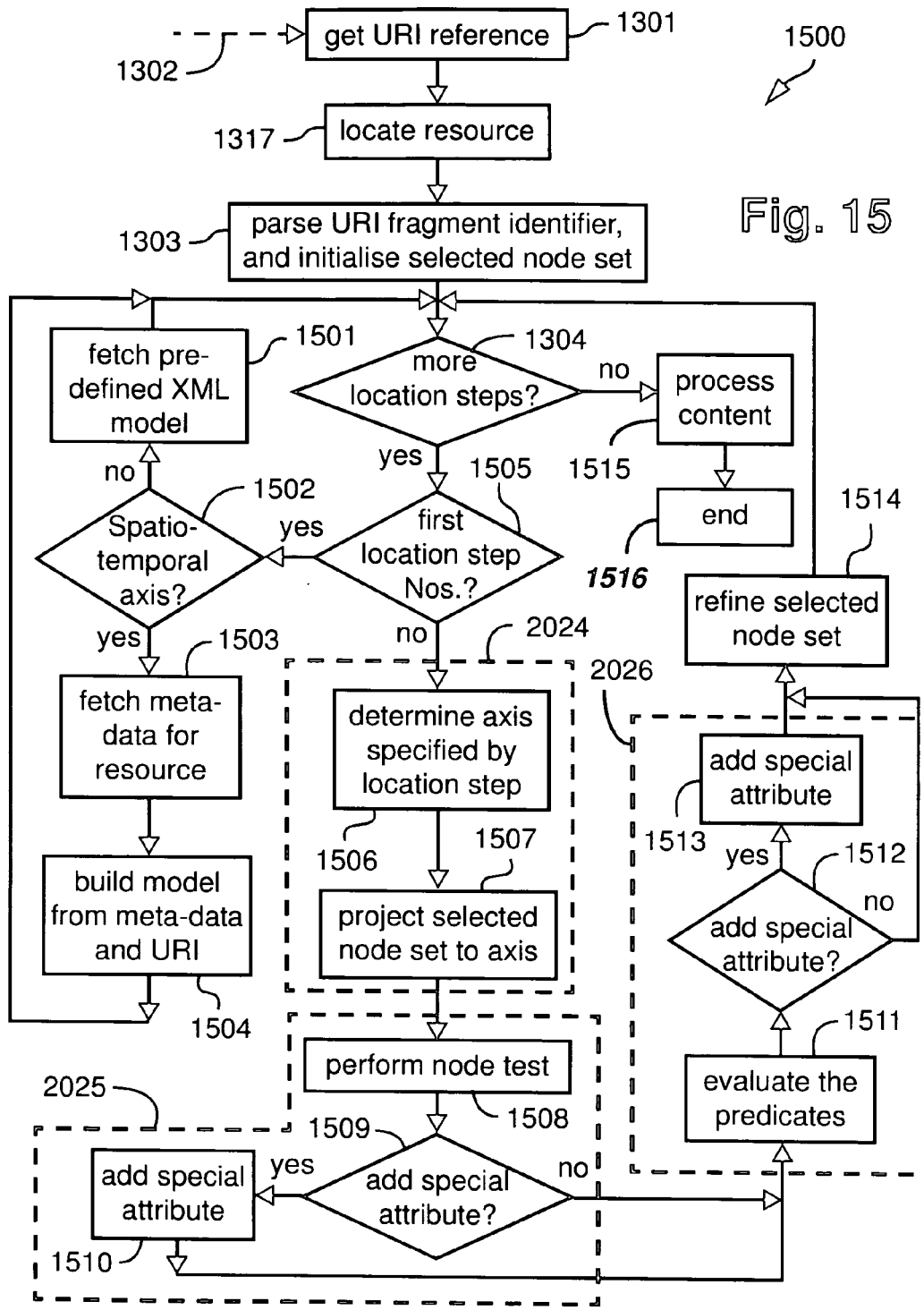
FIG. 15 shows a process flow for the arrangement of FIG. 14.

FIG. 15 is a process flow diagram for the arrangement in FIG. 12. The steps 1301, 1317, 1303, and 1304 perform identically to the corresponding steps in FIG. 14. Similarly, the steps 2024, 2025, and 2026 perform identically to the corresponding steps in FIG. 12. The first step 1301 receives an URI reference as depicted by 1302. A following step 1317 locates the resource referenced by the URI part of the URI reference, after which the step 1303 parses the URI fragment identifier into a series of corresponding location steps. The step 1303 also initialises a "current resource fragment" to be the resource located in the step 1317. The step 1303 also initialises a "selected node set" to reference the "current resource fragment". The resource referenced by the explicit fragment reference at any time is referred to as the current resource fragment.

A following step 1304 determines if any further location steps are available for processing. If this is the case, then a following step 1505 determines whether the location step currently being considered is the first location step. If so, then the process 1500 follows a "YES" arrow to a step 1502. The step 1502 determines if the root location step has a spatio-temporal axis. If so, then a subsequent step 1501 fetches a pre-defined XML model for the resource. The process 1500 is then directed back to the step 1304. If the step 1502 determines that the root location step does not has a spatio-temporal axis, then the process 1500 is directed from the step 1502 to a step 1503 which fetches meta-data for the resource in question. A following step 1504 builds a model for the resource from the meta-data and the URI obtained in the step 1301. The process 1500 is then directed back to the step 1304.

Returning to the step 1505, if the location step in question is not the first such step, then the process 1500 is directed by a "NO" arrow to the step 2024 (see FIG. 14). A first sub-step 1506 in the step 2024 determines the axis specified by the location step in question. Then a step 1507 projects the selected node set to the axis. The process 1500 is then directed to the step 2025 (see FIG. 14).

A first sub-step 1508 of the step 2025 performs a node test, after which a step 1509 determines whether special attributes are to be added. Special attributes may be added when spatio-temporal axes and node-tests are processed. If this is the case, then the process 1500 is directed by a "YES" arrow to a step 1510 that adds the special attributes. The process 1500 is then directed to the step 2026 (see FIG. 14). If special attributes are not required, then the process 1500 is directed by a "NO" arrow from the step 1509 to the step 2026.

A first sub-step 1511 of the step 2026 evaluates the predicates. Then a step 1512 determines whether special attributes are to be added. Special attributes may be added when spatio-temporal axes, node-tests or functions are processed. If this is the case, then the process 1500 is directed by a "YES" arrow to a step 1513 that adds the special attribute. The process 1500 is then directed to a step 1514 that refines the selected node set. If a special attribute is not required, then the process 1500 is directed by a "NO" arrow from the step 1512 to the step 1514. The process 1500 is directed from the step 1514 back to the step 1304.

Returning to the step 1304, when no further location steps are available for processing, then the process 1500 is directed by a "NO" arrow to a step 1515 that processes the content according to the refined selected node set. The process 1500 then terminates at a step 1516.

As an example, let's assume that a consumer device has been passed the same URI reference 1002:

urn:aParticularAudioCD#mp(/CDAudio/Track[1]/~time('30'))      [56]

that includes a "mp" fragment identifier for retrieving and playing a fragment of an Audio CD. Again, we assume that the following URI refers to a CD that is in a local CD drive, and the same set of basic operations (see [50] and Table 1) is supported by the system.

In the step 1106, the "mp" Fragment Identifier Parser parses the following fragment identifier:

mp(/CDAudio/Track[1]/~time('30'))      [58]

The parsing operation produces the following location steps:
CDAudio

Track[1]      [59]

~time('30')

In the step 2023, the "mp" Fragment Evaluator 2015 opens the CD with OPEN_CD (driveid) and then uses GET_TOC (CD_Id) to gather information about the CD tracks and construct an XML representation of the CD logical structure. One example of such an XML representation, depicted as 2040 in FIG. 14, is as follows:

```
<CDAudio uri="urn:aParticularAudioCD">                        [60]
    <Track type="audio" number="1" start_frame="0" />
    <Track type="audio" number="2" start_frame="17850"
    title="Introduction"/>
    <Track type="audio" number="3" start_frame="18030" />
    ...
    <Track type="audio" number="8" start_frame="176750" />
    <Track type="data" number="9" start_frame="210350" />
</CDAudio>
```

The remaining location steps 1110 are evaluated against the XML model as shown in the following Table:

TABLE 4

Location steps evaluated against the XML model [60]

| Location step | Component | Selected nodes and added attributes |
|---|---|---|
| Track[1] | Node-test "Track" | <Track type="audio" number="1" start_frame="0" /> <br> <Track type="audio" number="2" start_frame="17850" /> <br> ... <br> <Track type="audio" number="8" start_frame="176750" /> <br> <Track type="data" number="9" start_frame="210350" /> |
|  | Predicate "[1]" | <Track type="audio" number="1" start_frame="0" /> |
| ~time('30') | Node-test "time('30')" | <Track type="audio" number="1" start_frame="0" mp:start_time="30" /> |

By the steps 2024, 2025 and 2026. Note that the node-test, ~time('30'), adds the following attribute to denote the time interval (in this case, 30 second from the start to the end of the track) selected by the time node-test:

mp:start_time="30"     [61]

After all the location steps 1110 have been evaluated, the following final set of selected nodes 2027, depicted in [62] is passed to the Content Processor 2035:

(<Track type="audio" start_frame="0" mp:start_time="30"/>)     [62]

The Content Processor 2035 calls the operation PLAY_TRACK(1, 30) to play the required temporal fragment of track 1 of the CD. It should be noted that, in the example, the selected node set 2027 is depicted in [62] in the form of XML elements for illustration purposes. In practice however the selected node set 2027 is typically implemented as software objects using programming languages such as Java and C++. Once the selected node set 2027 is completely defined, the Content Processor 2035 can invoke various basic operations such as play, copy, etc. that are supported by the object. The "object" referred to is the software object in terms of which, as noted in regard to FIG. 11, the term explicit fragment reference is defined, these software objects being usable to explicitly direct processes and/or devices to play or retrieve the desired AV fragment(s) addressed by the fragment identifier. For instance, a class of objects AudioTrackFragment may be implemented to represent nodes selected from an AudioCD logical model, and AudioTrackFragment has a play method which calls the system operation PLAY_TRACK( ).

With this approach, complex XPath syntax and semantics are handled by the underlying XPath evaluator 2015. Extensions to the "mp" Audiovisual Addressing scheme only require incremental changes to the "mp" Fragment Evaluator 2015 by modifying the affected node-test step 2025 and predicate function step 2026 or implementing new node-test and predicate functions. While new logical models can be supported by adding code to construct the XML representation of the logical model in the step 2023.

The "mp" Fragment Evaluator 2015 provides a further advantage. The selected node set 2027 compiled by the evaluator 2015 can be output in XML form and examined. This enables the "mp" fragment identifier represented by the selected node set 2027 to be validated by checking that the intended fragments are to be selected from the resource 1104 without requiring the presence of the actual resource 1104. For instance, in the above example, the following XML representation of the final set of selected nodes 2027 can be used to verify that the initial "mp" fragment identifier [54B] actually does select the fragments that are intended to be retrieved:

<Track type="audio" number="1" start_frame="0"
    mp:start_time="30"/>     [63]

To illustrate how the approach of FIG. 14 can deal with complex XPath syntax and semantics with ease. We apply the complex fragment of [54] to the resource:

urn:aParticularAudioCD

That is, we will try to resolve the following URI reference:

[64]
urn:aParticularAudioCD#mp(/CDAudio/Track[type="audio"][(position( )=1 or position( )=last( )) or preceding-sibling::Track[1][contains(@name, "introduction")]]/~time('0', '30'))

In the step 1106, the "mp" Fragment Identifier Parser parses the fragment identifier and produces the following location steps:

[65]
CDAudio
Track[type="audio"][(position( )=1 or position( )=last( )) or preceding-sibling::Track[1]
[contains(@name,"introduction")]]
~time("0",'30')

In the step 2023, the "mp" Fragment Evaluator 2015 opens the CD with OPEN_CD (driveId) and then uses GET_TOC (CD_Id) to gather information about the CD tracks and construct an XML representation of the CD logical structure as follows:

```
<CDAudio uri="urn:aParticularAudioCD">                           [66]
  <Track type="audio" number="1" start_frame="0" />
  <Track type="audio" number="2" start_frame="17850"
    title="Introduction"/>
  <Track type="audio" number="3" start_frame="18030" />
  ...
  <Track type="audio" number="8" start_frame="176750" />
  <Track type="data" number="9" start_frame="210350" />
</CDAudio>
```

The remaining location steps 1110 are evaluated against the XML model as shown in the following Table:

TABLE 5

Location steps evaluated against the XML model [66]

| Location step | Component | Selected nodes and added attributes |
|---|---|---|
| Track[. . . ] | Node-test "Track" | <Track type="audio" number="1" start_frame="0" /><br><Track type="audio" number="2" start_frame="17850" title="First introduction"/><br><Track type="audio" number="3" start_frame="18030" /><br>...<br><Track type="audio" number="8" start_frame="176750" /><br><Track type="data" number="9" start_frame="210350" /> |
| | Predicate "[type="audio"]" | <Track type="audio" number="1" start_frame="0" /><br><Track type="audio" number="2" start_frame="17850" title="First introduction"/><br><Track type="audio" number="3" start_frame="18030" /><br>...<br><Track type="audio" number="8" start_frame="176750" /> |
| | Predicate "[(position( )=1 or position( )=last( )) or preceding-sibling::Track[1][contains(@name, "introduction")]]" | <Track type="audio" number="1" start_frame="0" /><br><Track type="audio" number="3" start_frame="18030" /><br><Track type="audio" number="8" start_frame="176750" /> |
| ~time ("0", '30') | Node-test "time ("0", '30')" | <Track type="audio" number="1" start_frame="0" mp:start_time="0" mp:end_time="30"/><br><Track type="audio" number="3" |

TABLE 5-continued

Location steps evaluated against the XML model [66]

| Location step | Component | Selected nodes and added attributes |
|---|---|---|
| | | start_frame="18030" mp:start_time="0" mp:end_time="30"/> <Track type="audio" number="8" start_frame="176750" mp:start_time="0" mp:end_time="30"/> |

By the steps 2024, 2025 and 2026. Note that the node-test, ~time("0", '30'), adds the following attribute to denote the time interval (in this case, 0 to 30 second of the track) selected by the time node-test:

```
    mp:start_time="0"                           [67]
    mp:end_time="30"
```

After all the location steps 1110 have been evaluated, the following final set of selected nodes 2027, is passed to the Content Processor 2035:

```
(<Track type="audio" number="1" start_frame="0"       [68]
mp:start_time="0"
mp:end_time="30"/>
(<Track type="audio" number="3" start_frame="10830"
mp:start_time="0"
mp:end_time="30"/>
(<Track type="audio" number="8" start_frame="176750"
mp:start_time="0"
mp:end_time="30"/>)
```

When processing the predicate:

```
[(position( )=1 or position( )=last( )) or preceding-
    sibling::Track[1][contains(@name, "introduc-
    tion")]], the "mp" Fragment Evaluator 2015
    evaluates the embedded addressing expression preceding-sibling::Track[1][contains(@name, "intro-
    duction")]                                        [69]
``` using the same process as FIG. 14.

For each of the selected nodes from the preceding step, in step 2023, the "mp" Fragment Evaluator 2015 construct a representation of the preceding siblings of the node. For instance, for the selected node of:

```
<Track type="audio" number="3" start_
    frame="18030"/>                                   [70]
``` it constructs the following:

```
<Track type="audio" number="2" start_frame="17850"    [71]
title="First Introduction"/>
<Track type="audio" number="1" start_frame="0" />
...
```

The remaining location steps 1110 are evaluated against [71] as shown in the following Table:

TABLE 6

Location steps evaluated against the XML model [71]

| Location step | Component | Selected nodes, added attributes and returned value |
|---|---|---|
| Track[1] | Node-test "Track" | <Track type="audio" number="2" start_frame="17850" title="First introduction"/> <Track type="audio" number="1" start_frame="0" /> |
| | Predicate "[1]" | <Track type="audio" number="2" start_frame="17850" title="First introduction"/> |
| | Predicate "[contains(@name,"intro-duction")]" | true |

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

APPENDIX A

Examples of pre-defined logical models for CDAudio and DVD-Video One [0] possible logical model for a CDAudio is as follows:

```
<?xml version="1.0"?>
<!DOCTYPE AudioCD[
    <!ELEMENT CDAudio (Track+)>
    <!ELEMENT Track EMPTY>
    <!ATTLIST CDAudio uri CDATA #REQUIRED>
    <!ATTLIST Track number CDATA #IMPLIED>
    <!ATTLIST Track type (audio|data) "audio">
    <!ATTLIST Track start_frame CDATA #REQUIRED>
]>
```

A possible (partial) logical model for a DVD-Video is as follows:

```
<?xml version="1.0"?>
<!DOCTYPE dvdVideo [
    <!ELEMENT dvdVideo (Title+)>
    <!ELEMENT Title (Chapter+)>
    <!ELEMENT Chapter (Audio*, Video*, Caption*)>
    <!ELEMENT Audio EMPTY>
    <!ELEMENT Video EMPTY>
    <!ELEMENT Caption EMPTY>
    <!ATTLIST dvdVideo uri CDATA #REQUIRED>
    <!ATTLIST Titie name CDATA #REQUIRED>
    <!ATTLIST Chapter name CDATA #REQUIRED>
    <!ATTLIST Audio id CDATA #REQUIRED>
    <!ATTLIST Audio lang CDATA #REQUIRED>
    <!ATTLIST Audio format (AC3|DTS|MPEG2|LPCM) "AC3")
    <!ATTLIST Video id CDATA #REQUIRED>
    <!ATTLIST Caption id CDATA #REQUIRED>
    <!ATTLIST Caption lang CDATA #REQUIRED>
]>
```

APPENDIX B

An Examples of Stored Meta-Data for an Audio CD

In the case of an Audio CD, six music samples from the left and the right channels are taken to form a frame. The frame is then encoded in the form of 8-bit words. The words are then scrambled and parities are added.

Each frame contains a sync word, sub-code signal, data bits, parity bits and merge bits. The 8-bit sub-code contains a P and a Q bit. 98 consecutive frames are collected together to from a sub-coding channel. There is a P-channel of 98 bits and a Q-channels of 98 bits.

The P channel indicates the starting and stopping of tracks. Music data is denoted by all zeros, the start flag precedes the musical selection by 2-3 seconds of "1"s. The lead out at the end of the disk is a 2 Hz alternating 1 and 0.

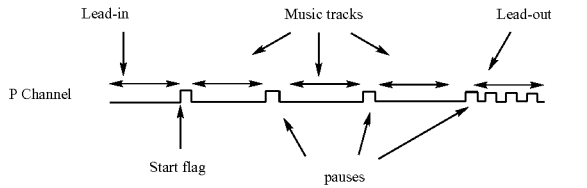

The Q channel contains the program and timing information. The first two bits are synchronization bits. Bit 3 indicates the number of channels, bit 5 is the copy-protect and bit 6 is the pre-emphasis bit. The next four bits control the mode. There are three defined modes: Mode 1, Mode 2 and Mode 3. The next 72 bits are data and the last 16 are a cyclic redundancy check on the channel data. Mode 1 data contains the timing information. In the lead-in area, this information consists of the number of tracks and the absolute starting time of each track. This information is continually repeated in the lead-in area, and allows the CD player to build the table of contents. In the program and lead-out areas, the Mode 1 data contains the track number, index numbers within a track, time within a track, and absolute time.

Mode 2 data contains a catalogue number (bar code) of the disk plus the absolute time count.

Mode 3 data contains codes for identifying each track for copyright logging plus the absolute time count.

For instance, the following stored metadata about an Audio CD may be retrieved from the Q channel of the Audio CD:

| Track | Start time (min:sec:frame) | Track Time (min:sec:frame) | Index |
|---|---|---|---|
| 1 | 0:0:0 | 3:58:17850 | 1 |
| 2 | 3:58:17850 | 5:20:41850 | 2 |
| . | | | |
| . | | | |
| . | | | |
| 8 | 39:16:176750 | 2:20:10500 | 8 |
| 9 | 46:44:210350 | 7:28:33600 | 9 |

The invention claimed is:

1. A computer-implemented method of determining explicit fragment references for a plurality of resource fragments of an audio-visual resource, wherein the resource fragments can be addressed using a hierarchical logical model for classes of resources of which the audio-visual resource is a member, and wherein the explicit fragment references are configured to direct at least one of a process and a device to each of the plurality of resource fragments, the method comprising the steps of:
   (a) inputting a URI reference comprising a Universal Resource Identifier and a complex fragment identifier comprising a plurality of audio-visual resource-specific location steps;
   (b) determining an audio-visual resource location using the Universal Resource Identifier;
   (c) constructing an XML (eXtensible Markup Language) representation of the audio-visual resource based on the hierarchical logical model and information collected from the audio-visual resource location, the hierarchical logical model being used to create the explicit fragment references, wherein the XML representation of the audio-visual resource includes XML elements and XML attributes that correspond to a super-set of the resource fragments of the audio-visual resource that are addressable by the complex fragment identifier using an extended Xpath addressing scheme;
   (d) evaluating a current resource-specific location step of the resource location steps against the XML representation of the audio-visual resource, the resource location step having a temporal or spatial axis, a node test and at least one predicate, the evaluating step comprising the steps of:
      (d-1) selecting a set of nodes in the XML representation of the audio-visual resource dependent upon the current location step, said selected set of nodes representing the explicit fragment references; and
      (d-2) projecting the selected set of nodes to the temporal or spatial axis specified by the current location step;
   (e) modifying an XML representation of the selected set of nodes, when the current location step is for one of a spatial or a temporal axis, said modifying step comprising the steps of:
      (e-1) evaluating the node test of the current location step to select the projections of the nodes on the axis;
      (e-2) adding XML special attributes to the XML representation of the selected set of nodes; and
      (e-3) applying the at least one predicate to refine the selected node set according to the added XML special attributes;
   (f) selecting a next resource specific location step from the resource location steps as the current location step; and
   (g) repeating said evaluating step (d) and modifying step (e) to provide a targeted degree of resolution for resolving the resource-specific location steps into a set of the explicit fragment references.

2. The method according to claim 1, wherein the evaluating step (d) is performed by an XPath evaluator that is extended by incorporation of node-tests and predicate functions necessary to support spatio-temporal axes of the logical model for the class of resources of which the audio-visual resource is a member.

3. The method according to claim 2, wherein the extension to the XPath evaluator modifies the XML representation to provide the targeted degree of resolution by adding at least one of XML attributes and XML elements that correspond to the resource fragment to the node set representing the explicit fragment references to denote a time point and a time interval.

4. The method according to claim 2, wherein the extension to the XPath evaluator modifies the XML representation to provide the targeted degree of resolution by adding at least one of XML attributes and XML elements that correspond to the resource fragment to the node set representing the explicit fragment references to denote shape, spatial location, spatial extent and/or spatial transformation over time.

5. An apparatus for determining explicit fragment references for a plurality of resource fragments of an audio-visual resource, wherein the resource fragments can be addressed using a hierarchical logical model for classes of resources of which the audio-visual resource is a member, and wherein the explicit fragment references are configured to direct at least one of a process and a device to each of the plurality of resource fragments, the apparatus comprising:
  a processor and a memory;
  inputting means for inputting a URI reference comprising a Universal Resource Name and a complex fragment identifier comprising a plurality of audio-visual resource-specific location steps;
  determining means for determining an audio-visual resource location using the Universal Resource Identifier;
  constructing means for constructing an XML (eXtensible Markup Language) representation of the audio visual resource based on the hierarchical logical model and information collected from the audio-visual resource location, the hierarchical logical model being used to create the explicit fragment references, wherein the XML representation of the audio visual resource includes XML elements and XML attributes that correspond to a super-set of the resource fragments of the audio-visual resource that are addressable by the complex fragment identifier using an extended Xpath addressing scheme;
  evaluating means for evaluating a current resource-specific location step of the resource location steps against the XML representation of the audio visual resource, the resource location step having a temporal or spatial axis, a node test and at least one predicate, the evaluating means comprising:
    selecting means for selecting a set of nodes in the XML representation of the audio-visual resource dependent upon the current location step, said selected set of nodes representing the explicit fragment references: and
    projecting means for projecting the selected set of nodes to the temporal or spatial axis specified by the current location step;
  modifying means for modifying an XML representation of the selected set of nodes, when the current location step is for one of a spatial or temporal axis, said modifying means comprising:
    evaluating means for evaluating the node test of the current location step to select the projections of the nodes on the axis;
    adding means for adding XML special attributes to the XML representation of the selected set of nodes; and
    applying means for applying the at least one predicate to refine the selected node set according to the added XML special attributes;
  selecting means for selecting a next resource specific location step from the resource location steps as the current location step; and
  repeating means for directing said evaluating means and said modifying means to provide a targeted degree of resolution for resolving the resource-specific location steps into a set of the explicit fragment references.

6. An apparatus for determining explicit fragment references for a plurality of resource fragments of an audio-visual resource, wherein the resource fragments can be addressed using a hierarchical logical model for classes of resources of which the audio-visual resource is a member, and wherein the explicit fragment references are configured to direct at least one of a process and a device to each of the plurality of resource fragments, the apparatus comprising:
  a memory for storing a program; and
  a processor for executing the program, said program comprising:
    code for inputting a URI reference comprising a Universal Resource Name and a complex fragment identifier comprising a plurality of audio-visual resource-specific location steps;
    code for determining the audio-visual resource location using the Universal Resource Identifier;
    code for constructing an XML (eXtensible Markup Language) representation of the audio visual resource based on the hierarchical logical model and information collected from the audio-visual resource location, the hierarchical logical model being used to create the explicit fragment references, wherein the XML representation of the audio-visual resource includes XML elements and XML attributes that correspond to the resource fragments of the audio-visual resource that are addressable by the complex fragment identifier using an extended Xpath addressing scheme; and
    code for evaluating a current resource-specific location step of the resource location steps against the XML representation of the audio-visual resource, the resource location step having a temporal or spatial axis, a node test and at least one predicate, the evaluating step comprising:
      code for selecting a set of nodes in the XML representation of the audio-visual resource dependent upon the current locations step, said selected set of nodes representing the explicit fragment references; and
      code for projecting the selected set of nodes to the temporal or spatial axis specified by the current locations step;
    code for modifying an XML representation of the selected set of nodes, when the current location step is for one of a spatial or a temporal axis, said modifying step comprising:
      code for evaluating the node test of the current locations step to select the projections of the nodes on the axis;
      code for adding XML special attributes to the XML representation of the selected set of nodes; and
      code for applying the at least one predicate to refine the selected node set according to the added XML special attributes;
    code for selecting a next resource specific location step from the resource location steps as the current location step; and
    code for repeating execution of said code for evaluating and said code for modifying to provide a targeted degree of resolution for resolving the resource-specific location steps into a set of the explicit fragment references.

7. A non-transitory computer readable storage medium having recorded thereon a computer program for directing a processor to execute a method for determining explicit fragment references for a plurality of resource fragments of an audio-visual resource, wherein the resource fragments can be addressed using a hierarchical logical model for classes of resources of which the audio-visual resource is a member, and wherein the explicit fragment references are configured to direct at least one of a process and a device to each of the plurality of resource fragments, the program comprising:

code for inputting a URI reference comprising a Universal Resource Name and a complex fragment identifier comprising a plurality of audio-visual resource-specific location steps;

code for determining an audio-visual resource location using the Universal Resource Identifier;

code for constructing an XML (eXtensible Markup Language) representation of the audio visual resource based on the hierarchical logical model and information collected from the audio-visual resource location, the hierarchical logical model being used to create the explicit fragment references, wherein the XML representation of the audio-visual resource includes XML elements and XML attributes that correspond to the resource fragments of the audio-visual resource that are addressable by the complex fragment identifier using an extended Xpath addressing scheme; and code for evaluating a current resource-specific location step of the resource location steps against the XML representation of the audio-visual resource, the resource location step having a temporal or spatial axis, a node test and at least one predicate, the evaluating step comprising:

code for selecting a set of nodes in the XML representation of the audio-visual resource dependent upon the current location step, said selected set of nodes representing the explicit fragment references; and code for projecting the selected set of nodes to the temporal or spatial axis specified by the current location step;

code for modifying an XML representation of the selected set of nodes, when the current location step is for one of a spatial or a temporal axis, said modifying step comprising:

code for evaluating the node test of the current location step to select the projections of the nodes on the axis;

code for adding XML special attributes to the XML representation of the selected set of nodes; and code for applying the at least one predicate to refine the selected node set according to the added XML special attributes;

code for selecting a next resource specific location step from the resource location steps as the current location step; and code for repeating execution of said code for evaluating and said code for modifying to provide a targeted degree of resolution for resolving the resource-specific location steps into a set of the explicit fragment references.

\* \* \* \* \*